United States Patent
Kelly et al.

(10) Patent No.: US 9,491,389 B2
(45) Date of Patent: Nov. 8, 2016

(54) FOCAL PLANE ARRAY PROCESSING METHOD AND APPARATUS

(71) Applicants: Michael Kelly, North Reading, MA (US); Brian Tyrrell, Brookline, NH (US); Curtis Colonero, Shrewsbury, MA (US); Robert Berger, Lexinton, MA (US); Kenneth Schultz, Lexington, MA (US); James Wey, Arlington, MA (US); Daniel Mooney, Dracut, MA (US); Lawrence Candell, Arlington, MA (US)

(72) Inventors: Michael Kelly, North Reading, MA (US); Brian Tyrrell, Brookline, NH (US); Curtis Colonero, Shrewsbury, MA (US); Robert Berger, Lexinton, MA (US); Kenneth Schultz, Lexington, MA (US); James Wey, Arlington, MA (US); Daniel Mooney, Dracut, MA (US); Lawrence Candell, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 39 days.

(21) Appl. No.: 14/221,429

(22) Filed: Mar. 21, 2014

(65) Prior Publication Data
US 2014/0197303 A1   Jul. 17, 2014

Related U.S. Application Data

(62) Division of application No. 13/299,995, filed on Nov. 18, 2011, now Pat. No. 8,692,176, which is a division of application No. 11/978,351, filed on Oct. 29, 2007, now abandoned.

(60) Provisional application No. 60/854,963, filed on Oct. 27, 2006.

(51) Int. Cl.
*H04N 5/913* (2006.01)
*H04N 5/378* (2011.01)
(Continued)

(52) U.S. Cl.
CPC ............... *H04N 5/378* (2013.01); *G09C 1/00* (2013.01); *G11B 20/0021* (2013.01);
(Continued)

(58) Field of Classification Search
USPC ........... 250/208.1, 214 A; 257/292; 348/294, 348/297, 302, 308–310; 341/155–158, 172; 377/57–63
See application file for complete search history.

(56) References Cited

U.S. PATENT DOCUMENTS 4,475,047 A   10/1984   Ebert, Jr.
4,502,328 A   3/1985   Wood et al.
(Continued)

FOREIGN PATENT DOCUMENTS

AU        766636        10/2003
KR     10200514722      2/2005
(Continued)

OTHER PUBLICATIONS

W. Snoeys et al., "Pixel readout chips in deep submicron CMOS for ALICE and LHCb tolerant to 10Mrad and beyond," Jul. 1, 2001, Nuclear Instruments and Methods in Physics Research Section A: Accelerators, Spectrometers, Detectors and Associated Equipment, vol. 466, Issue 2, pp. 366-375.*
(Continued)

*Primary Examiner* — Renee Chavez
(74) *Attorney, Agent, or Firm* — Cooley LLP

(57) ABSTRACT

A digital focal plane array includes an all-digital readout integrated circuit in combination with a detector array. The readout circuit includes unit cell electronics, orthogonal transfer structures, and data handling structures. The unit cell electronics include an analog to digital converter. Orthogonal transfer structures enable the orthogonal transfer of data among the unit cells. Data handling structures may be configured to operate the digital focal plane array as a data encryptor/decipherer. Data encrypted and deciphered by the digital focal plane array need not be image data.

5 Claims, 32 Drawing Sheets

(51) Int. Cl.

| | | |
|---|---|---|
| G11B 20/00 | (2006.01) | |
| H04N 5/77 | (2006.01) | |
| H04N 21/4223 | (2011.01) | |
| H04N 21/4408 | (2011.01) | |
| G09C 1/00 | (2006.01) | |
| H04L 9/06 | (2006.01) | |
| H04L 9/12 | (2006.01) | |
| H04N 5/33 | (2006.01) | |

(52) U.S. Cl.
CPC ...... *G11B 20/00086* (2013.01); *H04L 9/0637* (2013.01); *H04L 9/12* (2013.01); *H04N 5/772* (2013.01); *H04N 5/913* (2013.01); *H04N 21/4223* (2013.01); *H04N 21/4408* (2013.01); *H04L 2209/12* (2013.01); *H04L 2209/805* (2013.01); *H04N 5/33* (2013.01); *H04N 2005/91364* (2013.01)

(56) References Cited

U.S. PATENT DOCUMENTS

| | | |
|---|---|---|
| 4,509,118 A | 4/1985 | Shenk |
| 4,590,583 A | 5/1986 | Miller |
| 5,202,846 A * | 4/1993 | Rasmussen ............ G06F 1/022 327/107 |
| 5,461,425 A | 10/1995 | Fowler et al. |
| 5,583,605 A | 12/1996 | Sakamoto |
| 5,963,675 A | 10/1999 | Van Der Wal et al. |
| 6,160,282 A | 12/2000 | Merrill |
| 6,348,990 B1 | 2/2002 | Igasaki et al. |
| 6,400,824 B1 | 6/2002 | Mansoorian et al. |
| 6,416,017 B1 | 7/2002 | Becker |
| 6,441,829 B1 | 8/2002 | Blalock et al. |
| 6,498,576 B1 | 12/2002 | Tian et al. |
| 6,518,909 B1 | 2/2003 | Yang et al. |
| 6,693,575 B1 | 2/2004 | Yang et al. |
| 6,740,879 B1 | 5/2004 | Tenhet et al. |
| 6,788,237 B1 | 9/2004 | Bidermann et al. |
| 6,788,240 B2 | 9/2004 | Reyneri et al. |
| 6,791,611 B2 | 9/2004 | Yang |
| 6,809,666 B1 | 10/2004 | Ewedemi et al. |
| 6,831,684 B1 | 12/2004 | Ewedemi et al. |
| 6,922,210 B2 | 7/2005 | Yang et al. |
| 6,970,195 B1 | 11/2005 | Bidermann et al. |
| 6,975,355 B1 | 12/2005 | Yang et al. |
| 6,985,181 B2 | 1/2006 | Ewedemi et al. |
| 7,038,716 B2 | 5/2006 | Klein et al. |
| 7,061,998 B1 | 6/2006 | Rodgers et al. |
| 7,095,355 B1 | 8/2006 | Graham et al. |
| 7,315,273 B2 | 1/2008 | Muramatsu et al. |
| 7,362,365 B1 * | 4/2008 | Reyneri ................ H04N 3/155 348/297 |
| 7,483,058 B1 | 1/2009 | Frank et al. |
| 7,495,964 B2 | 2/2009 | Taylor et al. |
| 7,501,627 B1 | 3/2009 | Herr |
| 7,557,334 B2 | 7/2009 | Lee et al. |
| 7,623,173 B2 | 11/2009 | Nitta et al. |
| 7,671,313 B2 | 3/2010 | Watanabe |
| 8,179,296 B2 | 5/2012 | Kelly et al. |
| 2004/0047030 A1 | 3/2004 | MacAulay |
| 2005/0280728 A1 | 12/2005 | Ishikawa et al. |
| 2006/0097902 A1 | 5/2006 | Muramatsu et al. |
| 2006/0194624 A1 | 8/2006 | Hsieh et al. |
| 2006/0243885 A1 | 11/2006 | Watanabe |
| 2007/0075888 A1 | 4/2007 | Kelly et al. |
| 2007/0300047 A1 | 12/2007 | Alfano et al. |
| 2008/0015742 A1 | 1/2008 | Kulyk et al. |
| 2009/0237534 A1 | 9/2009 | Okumura |
| 2010/0085458 A1 | 4/2010 | Horiguchi |
| 2010/0226495 A1 | 9/2010 | Kelly et al. |
| 2012/0218792 A1 | 8/2012 | Ziegler et al. |

FOREIGN PATENT DOCUMENTS

| | | |
|---|---|---|
| WO | WO 93/21624 | 10/1993 |
| WO | WO 99/13290 | 3/1999 |

OTHER PUBLICATIONS

"Revolutionary New Chip Delivers Better Pictures," and "Breakthrough Chip Delivers Better Digital Pictures for Less Power: Tiny cameras could run for years," Digital Photography Review. Available online at http://www.dpreview.com/news/0512/05121201new_chips.asp. Retrieved Sep. 14, 2006.

"ADSP-21msp58/59," Analog Devices: DPS Microcomputers, pp. 1-40 (1995).

"Specifying A/D and D/A Converters," National Semiconductor Application Note 156, pp. 1-6 (Feb. 1976.

Abouraddy, A.F. et al., "Quantum-optical coherence tomography with dispersion cancellation," Phys. Rev. A 65 053817, 6pp., 2002.

ADSP-21000 Family Application Handbook vol. 1, Analog Devices, Inc., pp. 113-140 (1994).

Allen, L.J. And Oxley, M.P., "Phase retrieval from series of images obtained by defocus variation," Optic Communications, 199:65-75 (Nov. 15, 2001).

Amain Electronics Literature Data Base, http://02f2c2d.netsolhost.com/info.html (Mar. 28, 2006).

Ando, et al., "Ultrafast Correlation Image Sensor: Concept, Deesign, and Applications", 1997 International Conference on Solid-State Sensors and Actuators, Chicago, Jun. 16-19, 1997.

Ando, et., "Correlation Image Sensor: Two-Dimensional Matched Detection of Amplitude-Modulated Light", IEEE Transactions on Electron Devices, vol. 50, No. 10, Oct. 2003.

Arens, E., et al., "Demand Response Enabling Technology Development." UC Berkeley, 108 pp., 2006.

Baron-Nugent, E.D. et al., "Quantitative Phase-Amoitude Microscopy I: Optical Microscopy," Journal of Microscopy, 206(3): 194-203 (Jun. 2002).

Barty, A., et al., "Quantitative Phase Tomography," Optics Communications, 175: 329-336 (Mar. 1, 2000).

Beleggia, M. et al., "On the Transport of Intensity Technique for Phase Retrieval," Ultramicroscopy, 102: 37-49 (2004).

Bermak, A., "A CMOS Imager With PFM/PWM Based Analog-To-Digital Converter," IEEE International Symposium on Circuits and Systems, Aug. 7, 2002 vol. 4, pp. IV-53-IV-56.

Bisogni, et al., "Performance of a 4096 Pixel Photon Countig Chip," SPIE, vol. 3445, pp. 298-304 (Jul. 1998).

Boussaid,F., Bermak, A., and Bouzerdoum, A., "A novel ultra-low power reset/read-out technique for megapixels current-mode CMOS imagers," 2003 33rd Conference on European Solid-State Device Research, Sep. 16-18, 2003, pp. 59-62.

Brown, D.; Daniel, B.; Horikiri, T.; King, P.; Nelson, D.; Small, M. "Advances in high-performance sensors for the military and commercial market." Proceedings of SPIE—The International Society for Optical Engineering, v 43692001, p. 419-426.

Brown, M et al., "Digital-pixel Focal Plane Array Development." Proc. of SPIE, vol. 7608, 2010.

Cabanski, W.; Breiter, R.; Koch, R.; Gross, W.; Mauk, K.-H.; Rode, W.; Ziegler, J.; Schneider, H.; Walther, M.; Oelmaier, R. Third generation focal plane array IR detection modules at AIM. Infrared Physics & Technology, v 43, n 3-5, Jun.Oct. 2002, p. 257-263.

Chen, J.C., et al., "Terahertz Detection Using Optical Parametric Upconversion and Geiger Mode Avalanche Photodiodes", Lasers and Electro-Optics, 2008 and 2008 conference on Quantum Electronics and Laser Science, CLEO/QELS 2008.

Cronin-Golomb, et al., "Phase Conjugate Interferometric Measure", Applied Optics, vol. 28, No. 24, Dec. 1989, pp. 5196-5197.

Culurciello, et al., "CMOS Image Sensors for Sensor Networks", Analog Integr Circ Sig Process (2006) 49:39-51.

Dahlin, M.; O'Rourke, E. "Advanced focal plane array systems for nextgeneration scanning remote sensing instruments." Proceedings of the SPIE—The International Society for Optical Engineering, v 4820, 2003, p. 406-417.

(56) References Cited

OTHER PUBLICATIONS

De Boer, J.F., et al., "Improved signal-to-noise ratio in spectral-domain compared with time-domain optical coherence tomography," Optics Lett. 28(21), pp. 2067-2069,2003.
Dickinson, A., et al, "A 256x256 CMOS active pixel image sensor with motion detection" <http://ericfossum.com/Publications/Papers/A%20256x256%20CMOS%20active%20pixel%20image%20sensor%20with%20motion%20detection.pdf> , 1995 IEEE International Solid State Circuits Conference, Digest of Technical Papers, pp. 226-227, San Francisco CA, Feb. 1995.
Dickinson, A., Mendis, S.,Inglis, D., Azadet, K. and Fossum, E.R., "CMOS Digital Camera with Parallel Analog to Digital Conversion Architecture" <http://ericfossum.com/Publications/Papers/CMOS%20digital%20camera%20with%20parallel%20analog-to-digital%20conversion%20architecture.pdf> , in Program of 1995 IEEE Workshop on CCDs and Advanced Image Sensors, Dana Point, CA, Apr. 20-22, 1995.
Fossum, E.R., "Smart Focal-Plane Technology for MicroInstruments and MicroRovers" (extended abstract) <http://ericfossum.com/Publications/Papers/Smart%20Focal-Plane%20Technology%20for%20Micro-Instruments%20and%20Micro-Rovers.pdf> in Proc. 1992 NASA/OAST Workshop on Microtechnologies and Applications to Space Systems, Pasadena, CA , May 1992.
Fowler, B., et al., "A CMOS Area Image Sensor With Pixel Level A/D Conversion," Information Systems Laboratory, Electrical Engineering Dept., Stanford University, Stanford, CA., Session No. TP 13.5, pp. 1-11 (Jun. 21, 2001).
Giacomini, J.D., "High-Performance ADCs Require Dynamic Testing," Application Note AD-02, National Semiconductor Corporation, pp. 1-14 (Aug. 1992).
Goda, et al., "Amplified Dispersive Fourier-Transform Imaging for Ultrafas Displacement Sensing and Barcode Reading," Applied Physics Letters, vol. 93, pp. 131109-1 through 31109-3 (published Oct. 2, 2008.
Goda, et al., "Serial Time-Encoded Amplified Imaging for Real-Time Observation of Fast Dynamic Phenomena," Nature: Letters, vol. 458, pp. 1145-1149 (Apr. 30, 2009).
Graham, R. et. al., "Signal processing on the focal plane array: an overview," Proceedings of SPIE—vol. 4130, Dec. 2000, pp. 237-244.
Guellec, F., et al, "A 253BCm pitch LWIR focal plane array with pixel-level 15-bit ADC providing high well capacity and targeting 2mK NETD," Infrared Technology and Applications XXXVI, Proc. of SPIE vol. 7660, 76603T (2010).
Hamamoto, T., Egi,Y.,Hatori,M., Aizawa, K., Okubo, T.,Maruyama, H. and Fossum, E.R., "Computational image sensors for on-sensor-compression," Proc. 5th International Conf. on Microelectronics for Neural Networks and Fuzzy Systems (MicroNeuro01996) IEEE Comp. Soc. Press, pp. 297-304 (1996).
Han, et al., "A 3-phase time-correlation image sensor using pinned photodiode active pixels", Sensors, Cameras, and Systems for Industrial/Scientific Applications XI, SPIE vol. 7536, 7536)S Jan. 2010.
International Search Report and Written Opinion, issued May 3, 2012, in corresponding International Patent Application No. PCT/US/2011/050889.
John L. Vampola "Chapter 5—Readout electronics for infrared sensors", in David L. Shumaker: The Infrared and Electro-Optical Systems Handbook, vol. 3—Electro-Optical Components. The International Society for Optical Engineering, Jan. 1993.
Kang, S.G., et al., "Infrared FocalPlane Array Readout Integrated Circuit With On-Chip 14 b A/D Converter," Proceedings of SPIE 5234:287-295 (2004).
Kato, J. and Yamaguchi, I., "Multicolor digital holography with an achromatic phase shifter," Optics Letters, 27(16): 1403-1405 (Aug. 15, 2002).
Kelly, M., Berger, R., Colonero, C., Gregg, M.,Model, J., Mooney, D., Ringdahl, E., "Design and testing of an all-digital readout integrated circuit for infrared focal plane arrays." Proceedings of SPIE, vol. 5902, 2005, pp. 105-115.
Kelly, M., Colonero,C., Tyrrell, B. and Schultz, K., The Digital Focal Plane Array (DFPA) Architecture for Data Processing "On-Chip". MSS Detectors. Feb. 2007.
Kemeny, S.E., et al., "Parallel processor array for high speed path planning" <http://ericfossum.com/Publications/Papers/Parallel%20processor%20array%20for%20high%20speed%20-path%20planning.pdf> , in Proc. 1992 IEEE Custom Integrated Circuits Conf., pp. P.6.5/1-5, Boston, MA, May 1992.
Kester, W., "High Speed Sampling ADCs," Section 4.
Kitchen, A., Bermak, A., and Bouzerdoum, A., "A 64 °-64 CMOS digital pixel array based on pulse width analogue to digital conversion, with on chip linearising circuit," Proceedings of SPIE, vol. 5274, 2004, p. 163-171.
Kitchen, A., Bermak, A., and Bouzerdoum, A., "PWM digital pixel sensor based on asynchronous self-resetting scheme," IEEE Electron Device Letters, vol. 25, No. 7, pp. 471013473, Jul. 2004.
Kleinfelder, S., et al., "A 10 000 Frame/s CMOS Digital Pixel Sensor," IEEE J. of Solid-State Circuits 36(12):2049-2059 (Dec. 2001).
Kleinfelder, S., et al., "A 10kframe/s 0.18μm CMOS Digital Pixel Sensor with Pixel-Level Memory," ISSCC 2001, Session 6 pp. 88-89 and 435-436 (2001).
Kleinfelder, S., et al., "Focal Plane Array Readout Integrated Circuit With Per-Pixel Analog-to-Digital and Digital-to-Analog Conversion," Proceedings of SPIE 4028:139-147 (2000).
Kozlowski, L.J., et al., "Progress Toward High-Performance Infrared Imaging Systems-on-a-Chip," Proceedings of SPIE 4130:245-253 (2000).
L. McIlrath, "Low power, low noise, ultra-wide dynamic range CMOS imager with pixel-parallel A/D conversion," IEEE Symposium on VLSI Circuits, Digest of Technical Papers, 2000, p. 24-27.
Leitgeb, R., et al., "Performance of Fourier domain vs. time domain optical coherence tomography," Optics Express 11(8), pp. 889-894, 2003.
Loomis, N. et al., "High-Speed Phase Recovery Using Chromatic Transport of Intensity Computation in Graphics Processing Units," Digital holography and Three-Dimensional Imaging, OSA Technical Digest (CD) (Optical Society of America, Apr. 11, 2010), paper.
Mandl, W., "12 Mega-pixel, 1,000 fps Visible Camera With a Nanowatt A/D Converter at Each Pixel",SPIE Proceedings 5883:1-12 (Aug. 2005).
Mandl, W., "A Photon to Digital Photo Diode Imaging Array" (Apr. 2001).
Mandl, W., Advances in on Focal Plane A/D With Low Power Optical Readout, SPIE Proceedings: 3379:473-482 (Apr. 1998).
Mandl, W., "An Instrument Quality Digital Camera That Transitioned to Low Cost High Volume Production," SPIE Proceedings 4818:230-241 (Jul. 2002).
Mandl, W., "Four Kiloframe, 14 bit, 128X128 Digital Imaging Spectrometer," SPIE Proceedings 4486:385-392 (Aug. 2001).
Mandl, W., "Low Power MWIR Sensor With Pixel A/D Achieves 32 Bit Quantization Level at 30 FPS," SPIE Proceedings, vol. 6206, (Apr. 2006).
Mandl, W., "The Design of a 12 Mega-Pixel Imager With a Nanowatt A/D Converter at Each Pixel," SPIE Proceedings 5074:208-221 (Apr. 2003).
Mandl, W., "Visible Light Imaging Sensor With A/D Conversion at the Pixel," SPIE Proceedings 3649:1-13 (Jan. 1999).
Mandl, W., and Ennulat, Dr. Reinhard, "Space Based Digital LWIR HgCdTe Staring Focal Plane Array Design," SPIE Proceedings 3061:884-894 (Apr. 1997).
Mandl, W., et al., "A LWIR Focal Plane With Digital Readout Demonstrating a Passive Free-Space Optical Readout Link," SPIE Proceedings 3698:736-747 (Apr. 1999).
Mandl, W., et al., "Images and Test Results of MOSAD All digital 640X480 MWIR Prototype Camera," SPIE Proceedings 4131:355-363 (Jul. 2000).
Mandl, W., et al., "MOSAD IR Focal Plane Per Pixel A/D Development," SPIE Proceedings 2745:90-98 (Apr. 1996).
Mandl, W., et al., "Stream Vision, a Digital Imaging and Display Technology," SPIE Proceedings 3759:325-337 (Jul. 1999).

(56) References Cited

OTHER PUBLICATIONS

Mandolesi, et al., "A Scalable and Programmable Simplicial CNN Digital Pixel Processor Architecture", IEEE Transactions on Circuits and Systems—1: Regular Papers, vol. 51, No. 5, May 2004.
Mandolesi, et al., "A simplicial CNN Visual Processor in 3D SOI-CMOS", ISCAS 2006, Johns Hopkins University download on Feb. 25, 2009 from IEEE Xplore.
Mansoorian, B., Yee, H-Y., Huang, S. and Fossum, E.R., "A 250 mW, 60 frames/s 1280x720 pixel 9b CMOS digital image sensor" <http://ericfossum.com/Publications/Papers/A%20250%20mW%2060%20Frames%201280x720%20pixel%209b%20CMOS%20digital%20image%20sensor.pdf> , in Proc. 1999 IEEE International Solid-State Circuits Conference, pp. 310-311, San Francisco CA Feb. 1999.
Martijn, H.H., et al., "On-Chip Analog to Digital Conversion for Cooled Infrared Detector Arrays," Proceedings of SPIE 4028:183-191 (2000).
McIlrath, L., "Low power, low noise, ultra-wide dynamic range CMOS imager with pixel-parallel A/D conversion," IEEE Symposium on VLSI Circuits, Digest of Technical Papers, 2000, p. 24-27.
Melkonian, L.G., "Dynamic Specifications for Sampling A/D Converters," National Semiconductor Application Note 769:pp. 1-8 (May 1991).
Mendis, S., Kemeny, S. and Fossum, E.R., "A 128x128 CMOS Active Pixel Image Sensor for Highly Integrated Imaging Systems," in International Electron Devices Meeting (IEDM) Technical Digest, pp. 583-586, Washington D.C. Dec. 5-8, 1993.
Mendis, S., Kemeny, S.E.and Fossum,E.R., "CMOS Active Pixel Image Sensor," IEEE Transactions on Electron Devices, vol. 41, No. 3, Mar. 1994.
Nakamura, J., Pain, B.,Nomoto, T., Nakamura, T., and Fossum, E.R., "On-focal plane signal processing for current mode active pixel image sensors" <http://ericfossum.com/Publications/Papers/on%20focal%20plane%20signal%20processing%20for%20current%20mode%20active%20pixel%20image%20sensors%20IEICE.pdf> , in Tech. Rep. of the IEICE (Institute of Electronics, Information and Communications Engineers), ED197-49, pp. 13-18, (Oct. 1997) in Japanese.
Nasr, M.B., et al., Demonstration of Dispersion-Canceled Quantum-Optical Coherence Tomography, Phys. Rev. Lett. 91(8) 083601, 4 pp. 2003.
Notice of Allowance dated Jan. 13, 2012 of U.S. Appl. No. 11/415,007.
Nugent, K.A. et al., "Quantitative Phase Imaging Using Hard X Rays," Physical Review Letters, 77(14): 2961-2964 (Sep. 30, 1996).
Parshall, et al., "Phase-conjugate Interferometric Analysis of Thin Films", Applied Optics, vol. 30, No. 34, Dec. 1991, pp. 5090-5093.
Peizerat, A., et al. "An analog counter architecture for pixel-level ADC," 2007 International Image Sensor Workshop, Jun. 7-10, 2007, pp. 200-203.
Peizerat, et al., "Pixel-Level A/D Conversion: Comparison of Two Charge Packets Counting Techniques," 2007 International Image Sensor Workshop, pp. 200-203 (2007).
Peizerat, et al., "Pixel-Level ADC by Small Charge Quantum Counting," Electronics, Circuits and Systems, ICECS '06, pp. 423-426 (Issued Dec. 10-13, 2006; current version Jul. 2, 2007).
Practical Analog Design Techniques, Section 8, Analog Devices (1995).
Rizk, et al., "Flexible Readout and Integration Sensor (FRIS): New Class of Imaging Sensor Arrays Optimized for Air and Missile Defense", Johns Hopkins APL Technical Digest, vol. 28, No. 3 (2010).
Rollins, A.M., et al., "Optimal Interferometer Designs for Optical Coherence Tomography," Optics Lett. 24(21), pp. 1484-1486, 1999.
Schmitt, J.M., "Optical Coherence Tomography (Oct): A Review," IEEE J. Sel. Top. in Quantum Electron, 5, pp. 1205-1215, 1999.
Shapiro, et al., "Imaging with Phase-Sensitive Light," Proceedings of the International Conference quantum Information, Paper IthD1, Jun. 13, 2007, 2 pp.
Shapiro, J.H., "Quantum Gaussian Noise," Proceedings of SPIE 5111, pp. 382-395, 2003.
Shapiro, J.H., et al., "Semiclassical versus quantum behavior in fourth-order interference," J. Opt. Soc. Am. B 11(6), pp. 1130-1141, 1994.
Sorin, W.V., et al., "A Simple Intensity Noise Reduction Technique for Optical Low-Coherence Reflectometry," IEEE Photonics Tech. Lett 4(12), pp. 1404-1406, 1992.
Stobie, J.A.; Hairston, A.W.; Tobin, S.P.; Huppi, RJ.; Huppi, R. "Imaging sensor for the geosynchronous imaging Fourier transforn1 spectrometer (GIFTS)." Proceedings of the SPIE—The International Society for Optical Engineering, v4818,2002, p. 213-18.
Tadayyon, S., "A Pixel-Level A/D Converter for the Imaging Array of an Advanced Interferometer," Dept. of Electrical Engineering and Computer Science, Massachusetts Institute of Technology, pp. 1-84 (May 7, 1999).
Tearney, G.J., et al., "High-Speed Phase-and group-delay scanning with a grating-based phase control delay line," Optics Lett. 22(23) pp. 1811-1813, 1997.
Teagu, M.R., "Deterministic Phase Retrieval" A Green's Functional Solution, J. Opt. Soc. Am., 73(1): 1434-1441 (Nov. 1983).
Tech Notes, "Digital Focal-Plane Array," Lincoln Laboratory, downloaded from http://www.ll.mit.edu/publications/technotes/TechNote_DFPA.pdf on Sep. 21, 2010.
The Medipix1 Chip (PCC), downloaded from http://medipix.web.cern.ch/MEDIPIX/Medipix1/medipix1.html, Oct. 23, 2001, 2 pgs.
Tyrrell, B., et al. "Time Delay Integration and In-Pixel Spatiotemporal Filtering Using a Nanoscale Digital CMOS Focal Plane Readout." IEEE Transactions on electron Devices, vol. 56, No. 11, Nov. 2009.
Tyrrell, B., et al., "Design Approaches for Digitally Dominated Active Pixel Sensors: Leveraging Moore's Law Scaling in Focal Plane Readout Design." Proceedings of SPIE, vol. 6900, Feb. 2008.
U. S. Office Action Dated Sep. 15, 2011 in U.S. Appl. No. 11/415,007.
U.S. Office Action dated Oct. 27, 2010 for U.S. Appl. No. 11/415,007.
U.S. Office Action dated Apr. 21, 2011 in U.S. Appl. No. 11/415,007.
U.S. Office Action dated May 12, 2010 for U.S. Appl. No. 11/415,007.
U.S. Office Action dated Oct. 18, 2010 for U.S. Appl. No. 11/978,351.
U.S. Office Action, issued Jun. 17, 2013, in U.S. Appl. No. 13/299,995.
U.S. Office Action, issued Jan. 10, 2013, in U.S. Appl. No. 13/228,637.
Vampola, john L. (Jan. 1993), "Chapter 5—Readout electronics for infrared sensor", in David L. Shumaker: The Infrared and Electro-Optical Systems Handbook, vol. 3—Electro-Optical Components. The International Society for Optical Engineering.
Waller, L. et al., "Phase from Chromatic Alberrations," Optics Express, 18(22): 22817-22825 (Oct. 13, 2010).
Wojtkowski, M., et al., "Ultrahigh-resolution, high-speed, Fourier domain optical coherence tomography and methods for dispersion compensation," Optics Express 12(11), pp. 2404-2422, 2004.
Yang, D., Fowler, B., El Gamal, A., "128 °-128 pixel CMOS area image sensor with multiplexed pixel level A/D conversion," Proceedings of the Custom Integrated Circuits Conference, 1996, pp. 303-306.
Yang, D.X.D., et al., "A Nyquist-Rate Pixel-Level ADC for CMOS Image Sensors," IEEE J. of Solid-State Circuits 34(3):348-356 (Mar. 1999).
Yung, Y. and Bermak, A., "A Digital CMOS Imager with Pixel Level Analog-to-Digital Converter and Reconfigurable SRAM/Counter," Proceedings of the 4th IEEE International Workshop on System-on-Chip for Real-Time Applications (2004).
Zhou, Z., Pain, B., Panicacci, R., Mansoorian, B., Nakamura, J. and Fossum, E.R., "On-focal-plane ADC: Recent progress in on-focal plane ADCs," in Infrared Readout Electronics III, Proc. SPIE vol. 2745, pp. 111-122 Orlando, FL Apr. 1996.

* cited by examiner

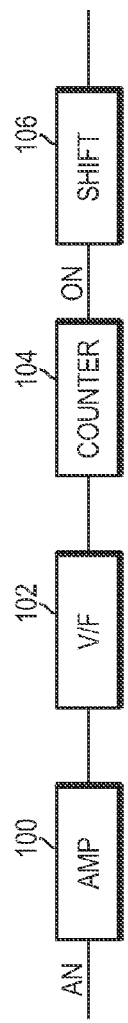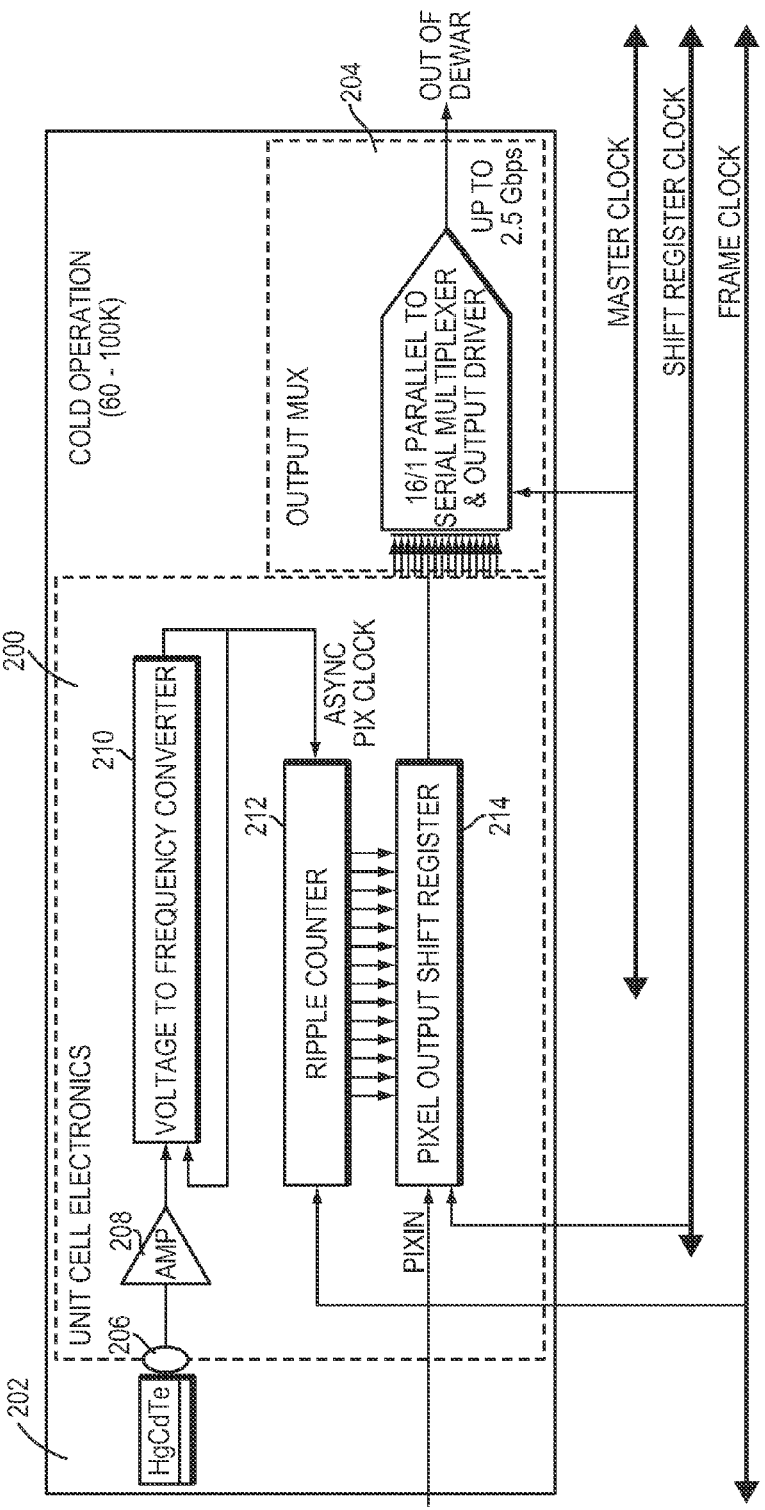

| LINE | INSTRUCTION | RELATIVE INTEGRATION TIME |
|---|---|---|
| 1. | 00101100 | -1 |
| 2. | 00101100 | -1 |
| 3. | 00101001 | -1 |
| 4. | 00100100 | -1 |
| 5. | 00000100 | +8 |
| 6. | 00100001 | -1 |
| 7. | 00101100 | -1 |
| 8. | 00101100 | -1 |
| 9. | 00111000 | -1 |

HIGH PASS FILTER KERNEL $$\begin{bmatrix} -1 & -1 & -1 \\ -1 & 8 & -1 \\ -1 & -1 & -1 \end{bmatrix}$$

FIG. 23

FOCAL PLANE ARRAY PROCESSING METHOD AND APPARATUS

RELATED APPLICATIONS

This application is a divisional application of U.S. application Ser. No. 13/299,995, which was filed on Nov. 18, 2011, as a divisional application of U.S. application Ser. No. 11/978,351, which was filed on Oct. 29, 2007 and entitled "Focal Plane Array Processing Method and Apparatus, which in turn claims a priority benefit under 35 U.S.C. §119(e) of U.S. Application No. 60/854,963, which was filed on Oct. 27, 2006, and entitled "Focal Plance Array for On-Chip Data Processing." Each of the above-referenced applications is incorporated herein by reference in its entirety.

GOVERNMENT SPONSORSHIP

This invention was made with government support under U.S. Air Force contract F19628-00-C-0002. The government has certain rights in this invention.

FIELD OF THE INVENTION

The invention relates to focal plane arrays and, in particular, to signal processing focal plane arrays.

BACKGROUND

High performance focal plane array (FPA) applications require wide-area coverage, high signal-to-noise-ratios (SNR), high spatial resolution, and high frame rates in various combinations. Conventional FPAs are not particularly well-suited to satisfying combinations of the above requirements. Conventional FPAs typically provide analog readouts, with the analog signals generated at the pixel level converted to digital signals "off chip." Once converted off-chip, the digital signals may be processed according to the demands of a particular application. Specific analog designs can target (and possibly satisfy) one or more requirement, but fail when simultaneously targeting the most aggressive design parameters for imaging applications, such as long-wave infrared imaging (LWIR) applications.

Fundamental limitations on achievable well depth (with concomitant limitations on capacitor size), and the readout noise floor, limit practical scalability of conventional designs. Capacitor size limitations require unnecessarily high frame rates to avoid saturating pixels. Electronics noise and ringing limit the amount of data that can be transmitted on a single output tap to maintain the needed SNR and dynamic range. Attempting to scale conventional analog technology to meet the most demanding requirements leads to a high-power-consumption FPA with many data output taps. This in turn leads to a large, massive, and complex sensor system. A compact focal plane array that provides internal processing would therefore be highly desirable.

SUMMARY

A digital focal plane array in accordance with the principles of the present invention includes an all-digital readout integrated circuit (also referred to herein, simply, as a readout circuit) in combination with a detector array. The readout circuit includes unit cell electronics, orthogonal transfer structures, and data handling structures. The detector array converts incident photons to an electrically detectable signal. In accordance with the principles of the present invention, the detector elements may be monolithically fabricated photodiodes in a unit cell, a hybridized photodiode array, a hybridized charge coupled device (CCD) detector array, or a linear mode photodiode (APD) array, for example. Each unit cell includes an analog-to-digital converter ADC. In an illustrative embodiment, the ADC is a single-slope ADC that allows for various counting/converting schemes. In accordance with the principles of the present invention, the orthogonal data transfer structure includes shift registers configured to shift conversion data among the various unit cells (for signal processing functions) or off the array (for readout). In accordance with the principles of the present invention, data handling structures may include parallel to serial multiplexers configured to serialize low-rate array data to a lower number of output taps. Data handling may also include logic operations performed prior to multiplexing. Such logic operations may be used, for example, to threshold data for match filtering. A digital focal plane array in accordance with the principles of the present invention may be configured to directly encrypt and decipher image or other data.

BRIEF DESCRIPTION OF THE DRAWINGS

The above and further features, aspects, and advantages of the invention will be apparent to those skilled in the art from the following detailed description, taken together with the accompanying drawings in which:

FIG. 1 is a conceptual block diagram of a digital focal plane array in accordance with the principles of the present invention;

FIG. 2 is a schematic diagram of an illustrative embodiment of unit cell electronics such as may be employed in a digital focal plane array in accordance with the principles of the present invention;

FIG. 23 is a tabular representation of a filter implementation in accordance with the principles of the present invention;

DETAILED DESCRIPTION

Figure 3:
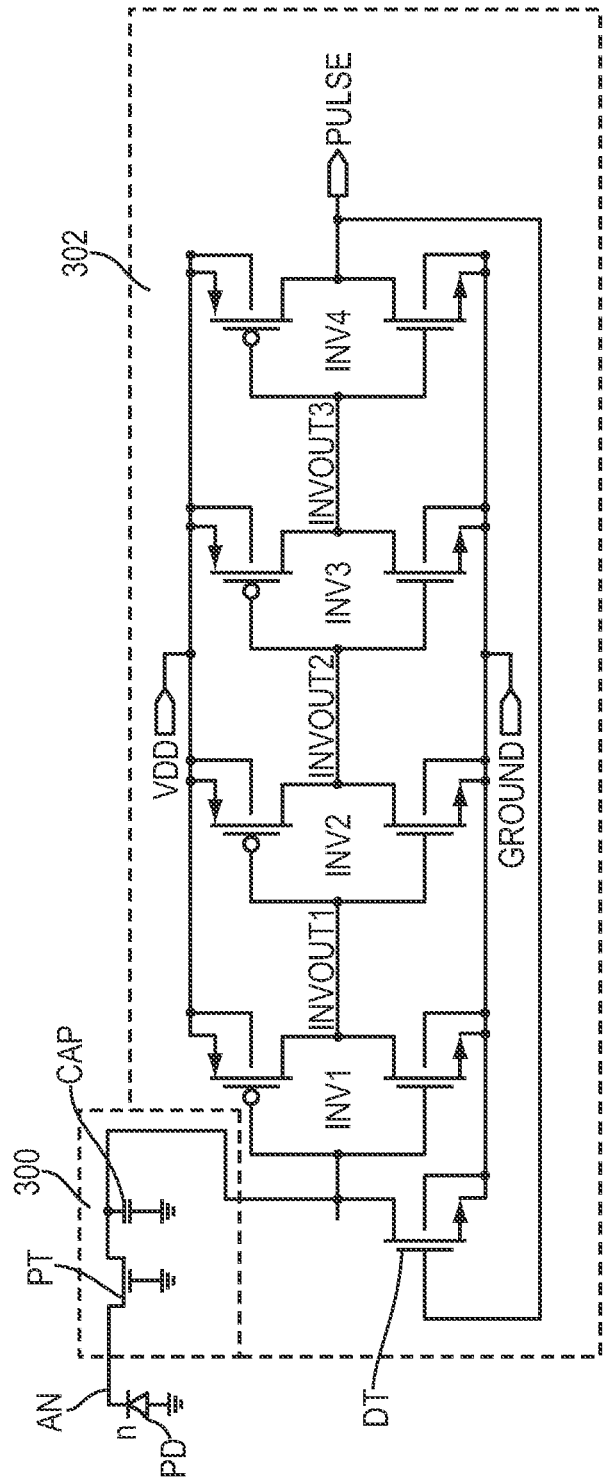
FIG. 3 is a schematic diagram of an illustrative embodiment of unit cell electronics such as may be employed in a digital focal plane array in accordance with the principles of the present invention.

The block diagram of FIG. 1 illustrates the major components of an individual ADC, such as may be found employed within a focal plane sensor array in accordance with the principles of the present invention. An amplifier 100 (which is optional, depending upon the quality of the signal to be converted) accepts an analog signal, AN, for conversion, amplifies and conditions the signal, AN, and provides the conditioned signal to a voltage to frequency converter (V-to-F) 102. In illustrative embodiments the amplifier 100 may be a direct injection, buffered direct injection, source-follower, or transimpedance amplifier, for example. The voltage-to-frequency converter 102 converters the voltage signal from the amplifier to a serial digital signal, the frequency of which is representative of the voltage input. The digital output of the voltage-to-frequency converter is routed to a counter 104, where the digital stream is counted. The resulting count, DN, is a digital signal the magnitude of which is representative of the magnitude of the input analog signal AN. In an illustrative embodiment, the each ADC in the array 100 includes a shift register 106 that may be employed to shift the digital output, DN, to other ADCs within the array 100 and/or outside of the array, for further processing and analysis, for example. In an illustrative embodiment, the voltage to frequency converter 102 may be replaced by a current to frequency converter (I-to-F), for example, to accommodate the output of an amplifier 100 configured as a current output amplifier.

The schematic diagram of FIG. 2 provides a more detailed view of an ADC 200 and peripheral circuitry, such as may be employed in an array (as described in greater detail in the discussion related to FIG. 4, for example) in accordance with the principles of the present invention. In this illustrative embodiment, an HgCdTe photo-detector, such as may be employed for sensing electromagnetic radiation in the infrared region of the spectrum, is bonded via bump-bond 206 to the input of the ADC 200. In this embodiment, an output multiplexor 204 is employed to multiplex the results of sixteen rows of ADCs. The input amplifier 208 and voltage-to-frequency converter 210 may be as described in the discussion related to FIG. 3, for example. In this illustrative embodiment, the pulse stream from the voltage to frequency converter 210 is fed to a ripple counter 212, which counts the pulses representative of the input photon flux impinging upon the photodetector 202. The results of the ripple counter may be shifted in parallel into a pixel output register 214, which, in turn may be employed to shift the results out of the array, through the output multiplexor 204, for example. The pixel output shift register 214 may also receive the output of other ADCs through the PIXIN input to the shift register 214. In this way, the count results from a row of ADCs may be shifted out through the output mutliplexor 204.

An ADC array may be employed, for example, in high performance long-wave infrared (LWIR) imaging applications that demand wide area coverage, high SNR, and high spatial resolution. In such an embodiment, a sensor array equipped with a large format, cryogenically cooled Hgl-xCdxTe focal plane array (FPA) with small pixels would supply analog current-mode signals to corresponding ADCs within an ADC array. The minimum useful pixel size in such a sensor array will ultimately be driven by the optical system. Advanced spectral sensors also demand very high frame rates to collect hundreds of channels in a short period of time. As previously described, conventional (analog) FPAs are not well suited to meet all of these requirements. Specific analog designs can target (and possibly achieve) one or more requirement, but fail when simultaneously targeting the most aggressive design parameters for LWIR applications. Fundamental limitations on achievable well depth (capacitor size) and the readout noise floor limit practical scalability of conventional designs. Capacitor size limitations require unnecessarily high frame rates to avoid saturating pixels. Electronics noise and ringing limit the amount of data that can be transmitted on a single output tap to maintain the needed SNR and dynamic range. Attempting to scale conventional analog technology to meet the most demanding requirements leads to a high-power FPA with many data output taps. This in turn leads to a large, massive, and complex sensor system. A digital focal plane array that employs an ADC array in accordance with the principles of the present invention may exploit commercially available, low voltage, and deeply scaled sub-micron CMOS processes, and, thereby, significantly reduce costs, in addition to providing superior performance. In an illustrative embodiment, such as described in the discussion related to FIG. 3, the charge accumulation capacitor, CAP, effectively defines the magnitude of the least significant bit of the ADC and the analog signal is digitized "on the fly," as photoelectrons generate charge, rather than waiting for charge accumulate on a large capacitor which would define the full-scale value of the ADC. By digitizing the signal while photoelectrons are being collected, rather than after charge accumulation, the need for large charge storage capacitors and highly linear analog electronics is eliminated. The power dissipation and noise problems associated with the analog readout approach are also greatly reduced.

That is, for example, in a conventional, LWIR analog, focal plane array a Hgl-xCdxTe photodiode array may be mated to a Silicon (Si) readout integrated circuit (ROIC). Photons absorbed within the active region of the photodiode detector are converted to electrons, producing a photocurrent. A conventional FPA integrates the current during a frame period onto a large capacitor, producing an analog voltage. The voltage produced on each capacitor, within each pixel, is proportional to the light intensity incident on the pixel. At the end of a frame period, one of several possible methods is used to transfer the voltage value for each pixel to an analog multiplexer and output driver and the capacitor is reset. Off-chip electronics condition the resulting analog date stream for quantization by an A/D converter. In this architecture, the capacitor size determines the most significant bit (MSB), and the off-chip electronics determine the least significant bit (LSB) of the sensor.

In a digital focal plane array that employs an ADC array in accordance with the principles of the present invention, the photocurrent drives a voltage-to-frequency (V/F) converter. The input of the V/F converter consists of a very small capacitor, which integrates the photocurrent. When the voltage reaches a pre-defined threshold level, a counter within the pixel is incremented and the capacitor is reset. The counter is incrementally increased throughout the entire frame period. No additional off-chip electronics are needed. At the end of a frame period, the digital counts for each pixel are transferred to a digital multiplexer and output driver for readout. In this architecture, the counter size determines the MSB and the capacitor size determines the LSB of the sensor. As previously described, a constituent ADC includes a pre-amplifier 208, voltage-to-frequency converter 210, sequential or non-sequential counter 212, and shift register 214. The shift register 214 may be employed for "snapshot" imaging in high background applications. Shift registers 214 may be serially connected to adjacent ADCs in each row to read out data bits. In snapshot mode, counters 212 within each ADC in the array 100 can operate while data from the previous frame is read from the array 100. In low background, long integration applications, the ripple counter 212 can be configured to count or shift values to adjacent pixels. In this configuration, the readout operates in a burst mode with little loss of signal. Significant reduction in ADC area can be achieved when the readout can operate in burst mode. In this illustrative embodiment, a ripple counter configuration was chosen over a synchronous counter because of its lower power consumption; every bit of a synchronous counter would be clocked at every V/F converter pulse. A ripple counter only clocks an average of two bits per pulse. The dynamic D flip-flop structures were built using true-single phase clock (TSPC) logic. Other dynamic D flip-flop designs may be employed, although they will, typically, consume more area. Using this design structure, one may implement the design using 12 transistors per register cell, making layout of an area-constrained design feasible. The three logic control lines handle the reset of the ripple counter, the load of the shift registers, and the clocking of the shift registers to output the data from the previous integration period.

The schematic diagram of FIG. 3 provides a more detailed illustration of an amplifier 100 and voltage-to-frequency converter 102, such as may be employed in an ADC array in accordance with the principles of the present invention. Such an embodiment may be used in conjunction with a photo-sensor array to form a readout integrated circuit, or, if the photo-sensor array is also incorporated, a digital focal plane array. In a photo-sensor array embodiment, a photo-sensor would produce a current signal, AN, that is representative of the photon flux impinging upon the photo-sensor. In this illustrative embodiment, a photo-diode PD produces a current in response to electromagnetic radiation impinging upon the photo-diode PN. As is known in the art, various types of photo-sensors may be employed to sense energy of different electromagnetic wavelengths. Current from the photo-diode PD is amplified by the pass transistor PT. The amplified current from the pass transistor is fed to the capacitor, CAP, where the charge is accumulated, thereby increasing the voltage on the capacitor CAP. In this illustrative embodiment, the pass transistor PT serves as a unity gain current buffer and, consequently, the amplifier exhibits unity gain. In this embodiment, the output of the amplifier is a current signal. To accommodate the current output of the amplifier, a current-to-frequency converter has been substituted for the voltage-to-frequency converter of FIG. 1.

The capacitor voltage signal is routed to the voltage to frequency converter 102, at the input to the first of four inverters, INV1, INV2, INV3, and INV4, connected in series. When the voltage on the capacitor CAP reaches the threshold voltage of the inverter INV1, the output state of INV1 switches (from "LOW" to "HIGH" in this illustrative embodiment). The subsequent inverters in the string, INV2 through INV4, also switch and the output, PULSE, switches state (from "LOW" to "HIGH" in this illustrative embodiment). When the signal PULSE goes "HIGH," it turns on the drain transistor, DT, which drains the capacitor, CAP. When the voltage on the capacitor, CAP, is drained below the threshold voltage of the inverter INV1, the inverter INV1, as well as subsequent inverters in the chain (e.g., INV2, INV3, INV4), change state, once again. The result of charging and discharging the capacitor, CAP, is, therefore, in this illustrative embodiment, a positive-going output pulse. As photons continue to impinge upon the photodiode PD, the capacitor will continue to charge to a voltage above the threshold voltage of the inverter INV1, switch the state of the inverters, be discharged by drain transistor DT, and, consequently, produce more output pulses. The rate at which photons impinge upon the photodiode is proportional to the current produced by the photodiode and the rate at which the capacitor, CAP, is charged is also, therefore related to the rate at which photons impinge upon the photodiode PD. The rate at which pulses are produced is proportional to the rate at which the capacitor is charge and, therefore, the pulse rate output is proportional to the rate at which photons impinge upon the photodiode. The inverters INV2 through INV4 also provide pulse-shaping for the output signal, PULSE. In an illustrative embodiment, photocurrent is integrated onto the capacitor, CAP, until the threshold of the first stage inverter INV1 is reached. In this embodiment, the integration capacitor, CAP, is in the single-digit femtofarad range to meet a 10 kHz frame rate requirement with the appropriate input photocurrent. The capacitance value may be achieved, for example, by using the parasitic capacitance of the first inverter gate. In some applications, in the visible range, for example, it may be advantageous to charge the capacitor CAP at a higher rate for a given photo flux. An avalanche photodiode may be employed in order to charge the capacitor at a greater rate for a given photon flux. Additionally, the "effective capacitance" of the capacitor CAP may be reduced, allowing a smaller photon flux to switch the first inverter stage, by discharging a capacitor to a predetermined threshold level. A current mirror with gain or other amplifier with gain can be used as well.

Turning now to FIG. 2, as previously described, photocurrent from a detector, such as detector 202, drives the voltage-to-frequency converter through a preamplifier 208. A wide variety of pre-amplification techniques are compatible with an ADC array in accordance with the principles of the present invention (and readout integrated circuit and digital focal plane array that employ such an ADC array). Since the preamp is reset on each LSB, linearity is not a major issue as long as it is stable. In this illustrative embodiment, the voltage-to-frequency converter produces a pulse stream that is used as an asynchronous clock to drive the counter. At the end of a frame period, the digital number in the counter 212 is transferred to the shift register 214 and then to a 16:1 digital multiplexer 304 located at the edge of the unit cell array. In this illustrative embodiment, the multiplexer maximum output data rate (2.5 Gbps) was chosen for compatibility with off-the-shelf receiving electronics.

The signal to noise ratio achievable with a digital focal plane array in accordance with the principles of the present invention can be calculated from Eq. 1. The effective number of bits (ENOB) is a convenient figure of merit for comparing the digital focal plane array performance to existing sensor systems and commercial ADC products. The ENOB describes the SNR of the system, understated sampling conditions, relative to the quantization noise of an ideal ND converter. The ENOB specification for a real ND converter is always lower than the maximum bit depth.

$$SNR = \frac{1}{\sqrt{\frac{1}{12N^2} + \frac{1}{NC^2V^2}\left[CVq + kTC + \frac{e_n^2}{R_d^2}\frac{t}{2N}\right]}} \qquad \text{Eq. 1}$$

$$ENOB = \log_2(SNR) - 1.79 \qquad \text{Eq. 2}$$

Where N is the decimal count value read-out from the pixel, C is the effective input capacitance into the V/F converter, V is the threshold voltage of the V/F converter, q is the electronic charge unit, k is Boltzmann's constant, T is the temperature, $e_n$ is the input referred voltage noise density of the preamp, $R_d$ is the detector shunt resistance, and t is the frame integration time. The model considers quantization, kTC (associated with resting a capacitor), preamp, and shot noise.

Figure 4:
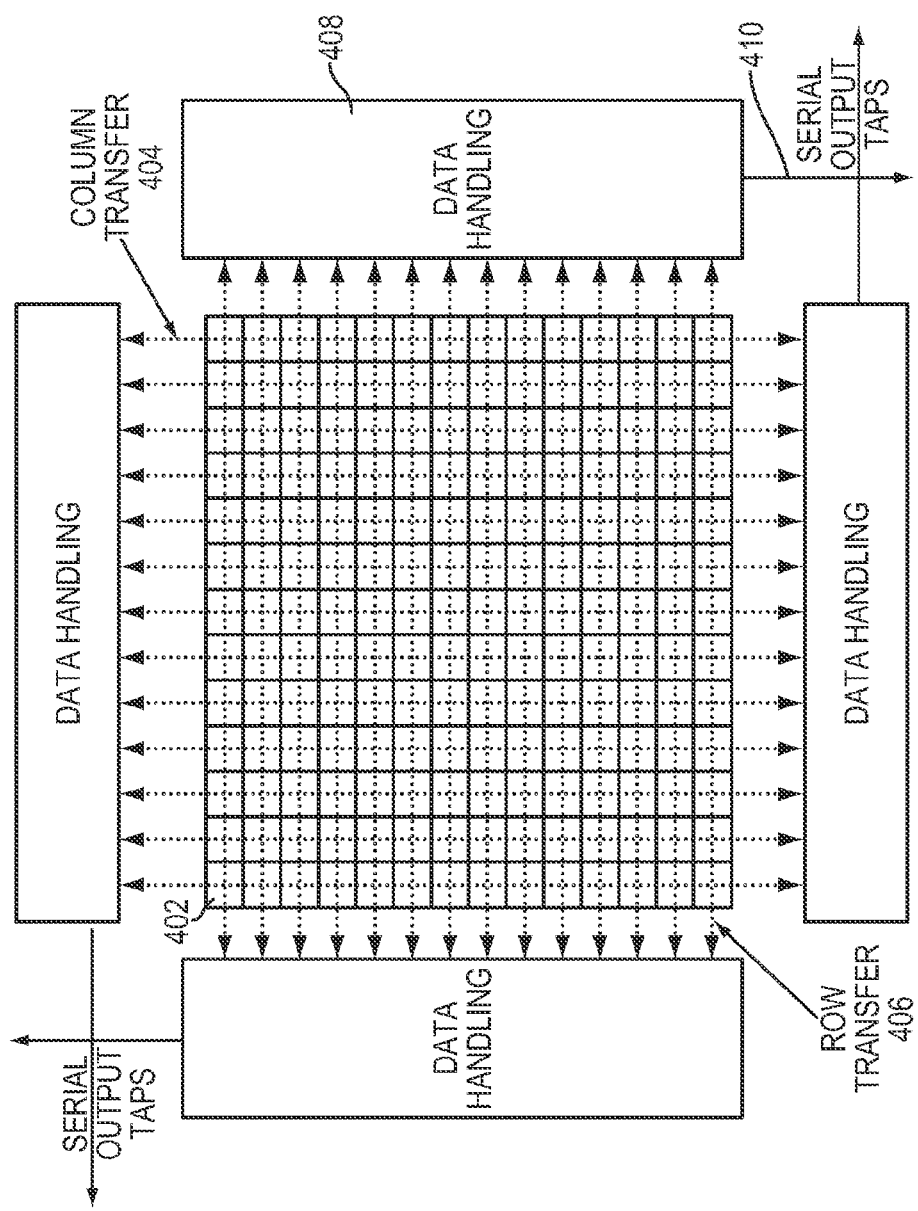
FIG. 4 is a block diagram of the architecture of readout electronics in accordance with the principles of the present invention.

As illustrated in the block diagram of FIG. 4, an ADC array 400 in accordance with the principles of the present invention may include circuitry that permits the orthogonal transfer of conversion results throughout the array. Each block within the illustrative array, such as block 402, represents an ADC. Digital results from each ADC may be transferred through a column transfer 404 and/or through a row transfer 406. In this manner, any result from any ADC within the array 400 may be transferred to any other ADC within the array 400; such transfer capability is what is referred to herein as orthogonal transfer. Such an orthogonal transfer capability provides an element of digital signal processing operation to the array 400 that permits the array to convert a plurality of analog signals to digital signals, then perform digital processing on the resulting digital signals. Data-handling circuitry 408 may be configured to provide additional data operations on the digital results of ADCs within the array 400. Serial output taps 410 may be employed to send the processed signals, for example, to an analyzer for computation and analysis. The analyzer may take the form of a core microprocessor, a microcontroller, or a general purpose or special function computer, for example.

In an illustrative embodiment the ADCs are implemented as single slope ADCs that convert photocurrent into a corresponding count. In such an embodiment, the readout of data is accomplished by clocking shift registers holding the stored count value in each pixel. Each counter could be buffered to a second register within the pixel or configured to readout directly. Each pixel shift register is configured to readout to any one of four orthogonally neighboring pixels, input by a controller. This orthogonal data transfer structure (OTS) is used to transfer count values from the unit cell to other unit cells (for signal processing purposes) or off the array (for readout). At the end of a frame period, the bits accumulated in the counter can be transferred to the counter of any other pixel by combining appropriate column and row shifts. Data, either raw or processed, are transferred off the edge of the array to data handling structures for further processing or direct readout.

Figure 5:
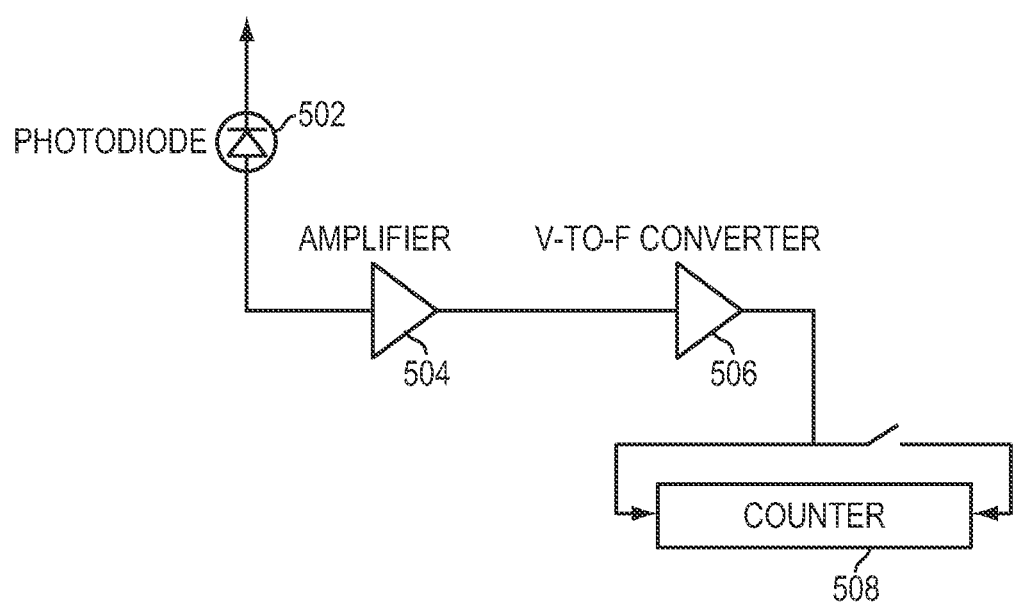
FIG. 5 is a block diagram of unit cell electronics in accordance with the principles of the present invention.

The block diagram of FIG. 5 illustrates an ADC implementation 500 such as may be employed within each of the cells 402 of an ADC array 400 in accordance with the principles of the present invention. In this illustrative embodiment, a photodiode 502 generates a current in response to impinging electromagnetic radiation. An amplifier 504, which may be, as previously described, a direct injection, buffered direct injection, source-follower, or transimpedance amplifier, amplifies the photocurrent produced by the photodiode. A voltage to frequency converter 506 converts the signal to a digital frequency signal, and a counter 508 counts the digital frequency signal. In this illustrative embodiment, the counter 508 is an up/down counter. The combination of orthogonal transfer capability, up/down counting, and the ability to select integration times (for example, simply by reading the ADC results at intervals of interest) provides the elementary functions required for digital signal processing. By controlling the accumulation time, the number and direction of counts, and the number and direction of shifts, the ADC array itself may be employed as an array-wide digital signal processor.

Using these elementary operations, digital signal processing functions included within the ADC array may include digital filtering, such as spatial or temporal filtering, autonomous digital threshold detection, time-domain filtering, including high-pass or low-pass filtering, and data compression, using, for example, Decimation. In an illustrative embodiment, the up/down counter 508 is a linear feedback shift register that is configured to perform both counting and data transfer operations. The linear feedback shift register is configured to either increment or decrement the sequence provided by the voltage to frequency converter within the same cell, or shifted into the cell from another ADC cell under control of signal that may be provided locally ("on-chip" in a single integrated circuit implementation) or remotely ("off-chip," which could be, for example, on an accompanying controller in a hybrid implementation, for example).

In an illustrative embodiment, an ADC array in accordance with the principles of the present invention may be configured to accept and convert analog signals that are spatially mapped to the arrangement of ADCs within the array. The spatial mapping may be, for example, a one-to-one mapping, with signals arriving at the top left ADC within the array originating at a corresponding location within an array of signals, the signal arriving at the bottom right ADC within the array originating at a corresponding location within an array of signals, and so on. In an integrated circuit embodiment, an entire ADC array may be implemented using a silicon CMOS process, for example. A digital focal plane array in accordance with the principles of the present invention, one that employs an ADC array in accordance with the principles of the present invention, may be a monolithic integrated circuit device, with detectors and readout integrated circuit formed in a single device, or it may be implemented as hybrid device, with the array of amplifiers, voltage to frequency converters, and counters all implemented in a single integrated circuit (using Silicon CMOS technology, for example) and mated, with a photodetector array using, for example, bump bonding. In such an illustrative embodiment, one in which an ADC array in accordance with the principles of the present invention is employed as a readout integrated circuit that operates in conjunction with a photosensor array, each of the ADCs within the array may occupy no more area than the area consumed by each of the corresponding photosensors.

In an illustrative embodiment an all-digital readout integrated circuit in accordance with the principles of the present invention may be used in conjunction with a cryogenically cooled infrared detector array, with connections between the detector array and the ROIC made via indium bump bonding. The hybrid device thus formed is referred to herein as a digital focal plane array. In an illustrative embodiment, the detector array senses incoming optical radiation in the infrared region of the spectrum (2-20 microns) using photodiodes to create currents that are proportional to the optical radiation impinging on the photodiodes. That is, each photodiode (also referred to herein as a pixel) in the detector array produces a current that is proportional to the photon flux impinging upon it. Each photodiode in the array has associated with it a unit cell in the ROIC. The current in each photodiode is collected in the photodiode's associated unit cell within the ROIC. The unit cell electronics integrate the charge and produces, via an analog to digital converter (ADC), a digital number (DN) that is proportional to the total charge accumulated over the frame period. In this illustrative embodiment, the DN for each pixel is then shifted to the edge of the ROIC and multiplexed with other DNs associated with other pixels for serial transfer off the array. By digitizing the signal while photoelectrons are being collected, rather than after charge accumulation, the need for large charge storage capacitors and highly linear analog electronics can be eliminated. The power dissipation and noise problems associated with a conventional, analog readout, approach are also greatly reduced. Additionally, this approach permits operation with circuitry that operates from a lower level power supply, because the dynamic range requirements associated with conventional systems needn't be maintained. Permitting operation with lower-level power supplies permits the use of Integrated Circuit processes that offer much smaller feature sizes, thereby further enabling the ADC and readout circuitry to be packed within an area less than or equal to the area consumed by the associated photodiode. Simplifying the unit cell preamplifier offers considerable power savings for large arrays.

In this illustrative embodiment, the capacitor is sized to define the least significant bit of the ADC. In this way, the size of the capacitor may be kept to a minimum, thereby significantly reducing the area required for the analog to digital conversion. In this illustrative embodiment, the analog to digital conversion is achieved via a voltage-to-frequency converter in which a predetermined amount of photocurrent charges the capacitor to a level that produces an output pulse and resets the capacitor. The output pulses are counted and the count in a given time period corresponds to the amount of photocurrent and, correspondingly, the light flux impinging on the associated photodiode. In this way, the illustrative embodiment of a DFPA in accordance with the principles of the present invention, digitizes the signal while photoelectrons are being collected, rather than after charge accumulation.

A system and method in accordance with the principles of the present invention may be employed to form a DFPA that includes a Nyquist-rate ADC formed wholly within the area of the ADC's associated detector or, pixel, pitch. In such and embodiment, each of the ADCs may operate independently of the other ADCs associated with other photodiodes. In accordance with the principles of the present invention, the detector elements may be monolithically fabricated photodiodes in a unit cell, a hybridized complementary metal oxide semiconductor (CMOS) photodiode array, a hybridized charge coupled device (CCD) detector array, or a linear mode photodiode (APD) array, for example.

In accordance with the principles of the present invention, on-chip processing leverages Digital Focal Plane Array (DFPA) technology to allow application of linear image processing filter kernels to be applied to a scene image prior to image data readout. Temporal filters and space-time filters can also be implemented. On-chip digital signal processing can provide capabilities useful in a number of imaging applications; spatial filters can be used to suppress background clutter, improve signal-to-noise ratio, improve image utility (e.g., through image smoothing or edge enhancement) and to identify objects of interest within a large scene. Temporal filters can be used for change or flash detection. When a region of interest is identified a detection flag may be set and communicated off the FPA; off chip data rates may be dramatically reduced. In many cases, the DFPA may operate autonomously, identifying scenes or objects of interest within a scene, for example.

Combining the focal plane array detection, analog to digital conversion, and signal processing electronics into a massively parallel architecture simplifies the overall system design and enables the production of resource-efficient sensors (i.e., sensors which minimize mass, volume and power requirements). The DFPA processing is achieved without the use of traditional digital adders or multipliers; rather the DFPA manipulates both the integration time and the sequential digital counters associated with every pixel to achieve the desired functionality. Use of a DFPA for signal processing can reduce overall system complexity by eliminating the need for most (if not all) of the traditional hardware required to perform digitization and processing tasks, i.e. discrete ADCs, memories, and processors.

Uncompensated material non-uniformity in dark current and QE, as well as the high incidence of non-responsive pixels may diminish the utility of on-chip signal processing. An apparatus and method in accordance with the principles of the present invention overcomes such obstacles.

A digital focal plane array in accordance with the principles of the present invention may be applied to diverse imaging system applications. Such an array may be applied, for example to surveillance applications. Surveillance applications may include, for example, a compact visible band imager capable of autonomous change detection and object class identification. On motion detections, the sensor could log the object class of the mover (e.g., large or small vehicle, walker, fast, slow, etc.). Or, the DFPA may be used in a VIS band spectrometer capable of continuous and autonomous spectral match filtering to a predefined library of spectra. It could trigger on change detections and log the presence of military painted vehicles as an example. Another surveillance application is that of a LWIR spectrometer for standoff remote sensing. It could be a grating or FTIR spectrometer. The DFPA could be used to remove background spectra in real time, eliminating a significant downstream processing step. Spectra or interferograms may be match filtered using the DFPA for detections without the use of any additional processors. As another example of a surveillance application for which the DFPA is suitable, the flash detection capability of the DFPA may be employed to identify the location of photonic transmitters in a large scene based on encrypted patterns of emitted photons. The very compact DFPA-based receiver could autonomously detect and process the flash patterns emitted from the transmitter to identify apposition in a very large field. The data read from the array could be massively compressed to ID map displays alone. In each of these illustrative embodiments, no processors or large memory arrays are required.

The DFPA architecture can be broken into four distinct subcomponents: a photo-sensitive detector array (PDA), unit cell electronics (UCE), orthogonal transfer structures (OTS), and data handling structures (DHS). A unit cell in accordance with the principles of the present invention may be employed to both overcome the low signal current presented by visible-band photodetectors and to enable a uniform pixel-to-pixel response. Pixel-to-pixel response non-uniformity, due to variations in both the detector and unit cell electronics, is of paramount importance to on-chip processing performance.

The photo-sensitive array converts incident photons to an electrically detectable signal. As will be described in greater detail below, a digital focal plane array in accordance with the principles of the present invention may employ a variety of photosensors each of which is suitable for a particular wave band. In an illustrative embodiment, visible waveband silicon photodetectors may be employed. In such an embodiment, the detector elements may be monolithically fabricated photodiodes in each unit cell, a hybridized CMOS photodiode array, a hybridized CCD detector array, or a linear mode APD array, for example. While building the device monolithically is the simplest and most economical option, the optical fill factor in such an embodiment may be exceedingly small and the resulting performance of such an implementation may have relatively limited application.

Figure 6:
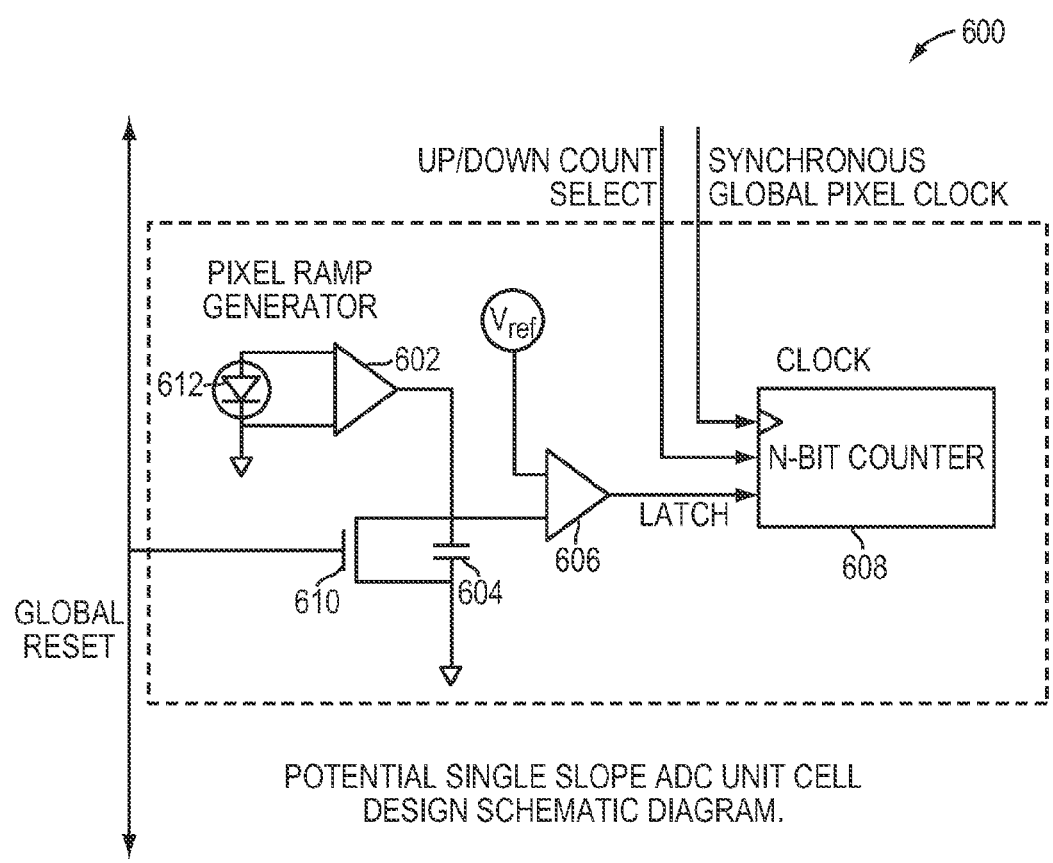
FIG. 6 is a block diagram of unit cell electronics in accordance with the principles of the present invention.

In the illustrative embodiment of FIG. 6, a single-slope ADC unit cell 600 contains a preamplifier 602, capacitor 604, comparator 606, bidirectional sequential counter 608, and reset circuitry 610. In this illustrative embodiment frame data collection begins by enabling the counters associated with each pixel 612 (also referred to herein a detector) to start counting. In this illustrative embodiment, the sequential DFPA counters are bidirectional, i.e., they can either increment or decrement the sequence depending on external control signals. The counters may also be designed to roll-over at the maximum/minimum count value, so a counter configured to decrement the sequence on initialization will simply count down from the counters maximum value (4096 for a 12 bit counter).

In this illustrative embodiment, the count rate is driven by one clock supplied from the periphery of the chip (a ring oscillator or input from off-chip). The photodiode 612 detects incoming photon flux and converts it to photocurrent. The current is integrated onto capacitor 604 through a preamplifier 602. The capacitor voltage is monitored with comparator 606. When the voltage on a capacitor 604 reaches the user-defined threshold voltage, globally supplied to each pixel from the periphery of the array, the counter 608 is disabled, latching the latest count value. Pixels supplying a large photocurrent to the capacitor will reach this disable state quickly, while low-signal pixels will count longer.

Many counting schemes are compatible with the DFPA. The best choice depends on trades between power and area requirements. An illustrative embodiment employs a ripple counter DFPA pixel. In that embodiment a separate buffer register in each cell may be used as a memory to store counts from the ripple counter and also to transfer data off-chip. A linear feedback shift register (LFSR) can more easily be configured to perform both counting and data transfer functions. Either can be configured to increment or decrement the sequence depending on an external control signal. The counters may be configured to count by any number, including one.

As previously noted, in an illustrative embodiment the ADCs are implemented as single slope ADCs that convert photocurrent into a corresponding count. In such an embodiment, the readout of data is accomplished by clocking shift registers holding the stored count value in each pixel. Each counter could be buffered to a second register within the pixel or configured to readout directly. Each pixel shift register is configured to readout to any one of four orthogonally neighboring pixels, input by a controller. This orthogonal data transfer structure (OTS) is used to transfer count values from the unit cell to other unit cells (for signal processing purposes) or off the array (for readout). At the end of a frame period, the bits accumulated in the counter can be transferred to the counter of any other pixel by combining appropriate column and row shifts. Data, either raw or processed, are transferred off the edge of the array to data handling structures for further processing or direct readout.

Many data handling structures (DHS) are compatible with the OTS. As previously noted, a parallel to serial multiplexer may be employed to serialize the low-rate array data to as few as one high-rate output tap. A fast shift register also can be used to burst data at a high rate as it is being fed into it from slower row shift registers. Additionally, logic operations can be performed on the data stream. These operations may be performed prior to multiplexing. Such logic operations may be used, for example, for thresholding data for match filtering. Thresholding may be employed to reduce power and data rate. For example, by thresholding data, then transmitting only detections, the DFPA's power and data rate may be significantly reduced.

A DFPA in accordance with the principles of the present invention may function as a real-time image or signal processing element or as a traditional imager. As a traditional imager, the DFPA's counters accumulate the signal for a frame period and directly readout the raw digital count values and, at the end of a frame period, the digital counts are transferred off the array by the OTS. The addition of image or signal processing may be implemented by utilizing the orthogonal transfer and bi-directional counting features of the DFPA, and many digital signal processing algorithms can be implemented directly on the imaging chip, in real time, and prior to reading out any data. Conventional focal planes must readout data to a processing unit or computer to perform image processing tasks. The kinds of operation for DFPA real-time processing may be categorized as static or dynamic. Static operations manipulate the data collected on a static scene in order to implement a linear digital filter operation on the data. The filter kernel could be predetermined to process the data in a way to identify features of interest. The operation can be spatial or spectral depending on the type of sensor. The simplest example of a static operation is a high pass image processing filter to identify edges in a scene. Dynamic operations manipulate the data collected from a changing scene to produce the desired filtering effect. The scene may be dynamic due to action within the scene itself or due to sensor field of view motion (controlled or uncontrolled). The simplest example of a dynamic operation is a change detection filter to identify moving or flashing objects in a scene.

Static operations may be based on the principle of convolution, which can be accomplished on the DFPA in real-time by manipulating the integration time, count shift position on the imaging array, and counting sequence direction (increment or decrement). The convolution coefficient amplitudes are defined by the integration time. The sign is controlled by count direction. The extent of the convolution kernel is defined by the number and direction of transfers between each integration period.

These operations effectively convolve the kernel with the entire image prior to readout. Filters for edge detection, smoothing, differentiation, etc. can easily be performed on the DFPA. In an illustrative embodiment, the scene must remain stationary for the entire time required to implement the filter. Using the convolution function, it is possible to develop a filter kernel for cross-correlation of objects in the scene. Also, the correlated image can be thresholded by the compare logic in the DHS for detections. The array could readout the raw cross-correlation image, or detections alone.

A similar operation can be carried out in one dimension. Grating based instruments typically use an imaging array to detect the dispersed spectrum of an image scene. There is a spatial and spectral dimension to the data on the FPA. Cross correlations to known spectra can be calculated by manipulating shifts, count direction, and integration times appropriately. A similar operation could be carried out using spectrometers based on dispersive elements or possibly circular or linear variable dielectric filters.

Dynamic operations use scene motion, either planned or not, to accomplish a goal. The goal might be to detect changes in pixel values to detect a flash or object motion. A very simple, but powerful filter for change detection can be implemented by integrating for a frame period with the counters configured to increment the count, and then integrating for the identical period with the counters configured to decrement the count. The resulting image is nominally zero everywhere, except where there was a change in the scene (e.g., object motion). The filtered data could subsequently be processed by the DHS to produce a velocity estimate for moving objects in the scene.

Alternatively, DFPA dynamic operations could be utilized solely to simplify sensor design. The DFPA could be configured to electronically track the scene using control inputs from an inertial measurement unit (IMU), or other platform stability measurement system. Pointing jitter requirements on a long range camera may be reduced because the DFPA can stabilize the image electronically. In this scenario, the IMU controls how to transfer count values within the array between sub-frame collections.

In another illustrative embodiment, the DFPA employs the up/down count feature for background subtraction. This is particularly important in the IR waveband where background radiance can be quite high. To accomplish background subtraction in real time requires the sensor to ping-pong between the target and reference scene. In targeted standoff FTIR spectroscopy for example, the sensor could ping pong between a target (while adding signal to the counters) and a nearby region of the same scene (while subtracting signal from the counters) for every point in the interferogram. The resulting spectrum (upon FFT) will depend only on the transmission and temperature of the targeted material. The background subtraction is a significant step in the data processing, and is eliminated using this technique.

In some applications, an image sensor is subjected to ionizing radiation (such as X-ray or gamma radiation). Such radiation generates additional electron-hole pairs in the photodetector, which then sum in with the photocurrent. Any excess charge that does not go into the input of the pixel of origin will bloom into adjacent pixels.

For a reset to voltage in the illustrative embodiment of FIG. 6 (including reset to ground), if the reset pulse duration is determined by the time necessary to untrigger the comparator 602, then a pixel 612 that receives a sudden spike of photocurrent due to ionizing radiation, for example, will not be reset until that excess charge is passed to the reset supply. This serves as an antibloom feature, while only resulting in a single pixel count. In this case, the reset to voltage approach may be directly inserted into an application that is subject to ionizing radiation.

For a charge balance approach to ADC, in cases where the input signal varies quickly with time, the subtracted charge may not be sufficient to un-trigger the ADC's comparator, i.e. the input to the comparator may remain high. To accommodate this case, the comparator output may be used to control an oscillator that will repeatedly pulse a charge subtract circuit until enough charge has been subtracted. It may also pulse the counter 608. If the counter is pulsed, then a true measurement of a large short duration charge packet may be obtained. If it is not pulsed, then large short duration pulses are rejected.

Figure 7:
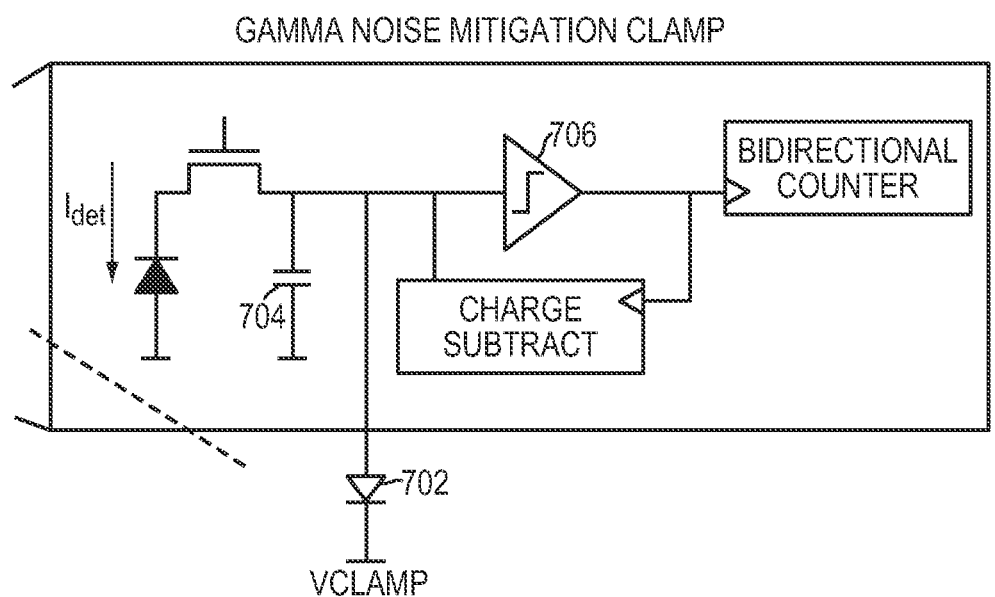
FIG. 7 is a block diagram of unit cell electronics in accordance with the principles of the present invention in which short pulses are mitigated.

For other ADC implementations, where the reset itself does not necessarily sink enough charge to handle a short duration pulse, a gamma noise mitigation clamp may also be added, as illustrated in FIG. 7. In this case, if the input signal Idet gets too high, it is sunk through the clamp path through clamp diode 702. The clamp may be implemented using a variety of devices, including diodes and MOS. The purpose of the clamp is to set a maximum voltage on the integration capacitor 704 that is above the threshold of the comparator 706 so that it does not affect normal operation of the ADC.

For large input current pulses, excess short-duration photocurrent pulses may be bled off through the clamp. In this illustrative embodiment, a short duration is a pulse that is less than on the order of the ADC pulse period. Short duration pulse suppression in accordance with the principles of the present invention may be employed to suppress transients due to a wide variety of causes, including sudden, short flashes of light; gamma noise suppression is only one application.

Figure 8:
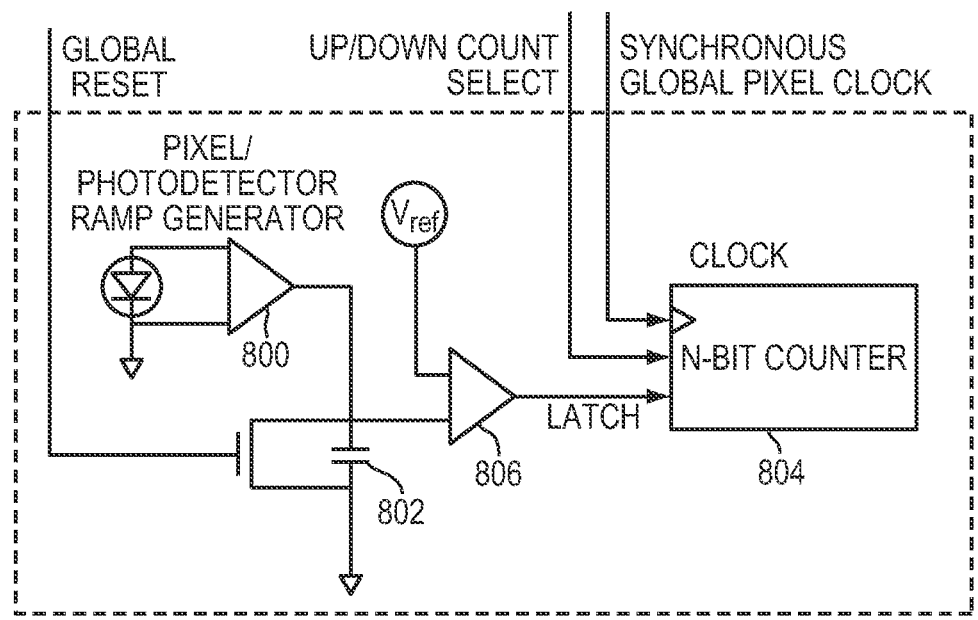
FIG. 8 is a block diagram of unit cell electronics in accordance with the principles of the present invention.

The block diagram of FIG. 8 illustrates a pulse width modulated ADC (also referred to as a SSCD analog to digital converter) such as may be employed within the ADC array of a digital focal plane array in accordance with the principles of the present invention. Such an ADC may be employed, for example, in lower-level signal applications. With lower-level signals, an integration capacitor and reference voltage may be more readily sized to accommodate the maximum anticipated signal. In this illustrative embodiment, photocurrent is integrated through a preamplifier 800 onto a capacitor 802, creating a voltage ramp. A synchronous global clock distributed to every pixel increments a sequential counter 804, nominally decrementing the count value. The count direction can be controlled via the "Up/Down Count Select" input. The counter value is latched when the ramp voltage is equal to a reference voltage supplied to a comparator 806. Nssc can be calculated from detector and source parameters.

$$N_{SSC} = \frac{CVf_c}{i_o + \varepsilon q\varphi A}$$

It may be convenient to operate the device in a count-down mode so that high flux values have higher digital count values at the end of a frame period.

$$N_{SSCD} = 2^b - \frac{CVf_c}{i_o + \varepsilon q\varphi A}$$

Where $f_c$ the clock frequency, C the integration capacitance, V the reference voltage, q the electronic charge unit, $i_o$ dark current, $\in$ quantum efficiency, $\Phi$ incident flux, and A detector area.

Figure 9:
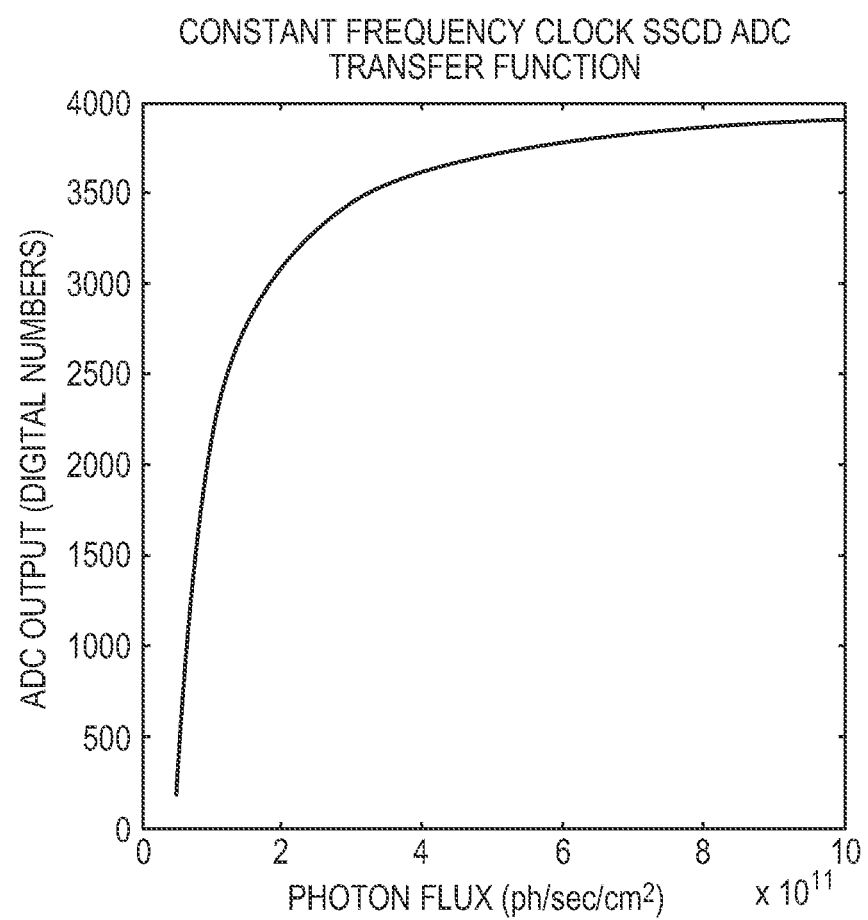
FIG. 9 is a plot of photon flux versus ADC output in accordance with the principles of the present invention.

This ADC produces a non-linear transfer function. The plot of FIG. 9 shows NSSCD (counts) as a function of photon flux (ph/cm2/sec) for a SSCD ADC implemented in a digital focal plane array. The counts are inversely proportional to the input flux. In many cases it may be desirable to have an output count linearly proportional to the signal current. In other cases, arbitrary transfer functions may be desired. Logarithmic compression is a common compression technique for viewing scenes with extremely large dynamic range. By controlling either the reference voltage or frequency, arbitrary transfer functions can be manufactured. Depending on hardware limitations and signal to noise requirements, it may be more advantageous to control the reference frequency. The examples below assume frequency control is the method utilized in-order-to achieve the desired results.

Assuming constant current and flux during a frame period:

$$N_{SSCD} = 2^b - t_{latch} f_c,$$

$$t_{latch} = \frac{CV}{i_o + \varepsilon q\varphi A}$$

$$f_c = f_c(t),$$

$$N_{SSCD} = 2^b - \int_0^{t_{latch}} f_c(t)\,dt$$

A simple implementation of the above manipulates the clock frequency to be proportional to the inverse of time raised to an arbitrary power.

$$f_c(t) = \frac{f_o}{t^\alpha},$$

$$N_{SSC} = \left(\frac{f_o}{(1-\alpha)t_{latch}^{\alpha-1}} + const\right),$$

$$\alpha \neq 1$$

$$N_{SSCD} = 2^b - \left(\left(\frac{CV}{i_o + \varepsilon q\varphi A}\right)^{1-\alpha}\left(\frac{f_o}{(1-\alpha)}\right) + const\right),$$

$$\alpha \neq 1$$

α is arbitrary depending on the desired transfer function. A linear transfer function can be obtained with α=2.

Figure 10:
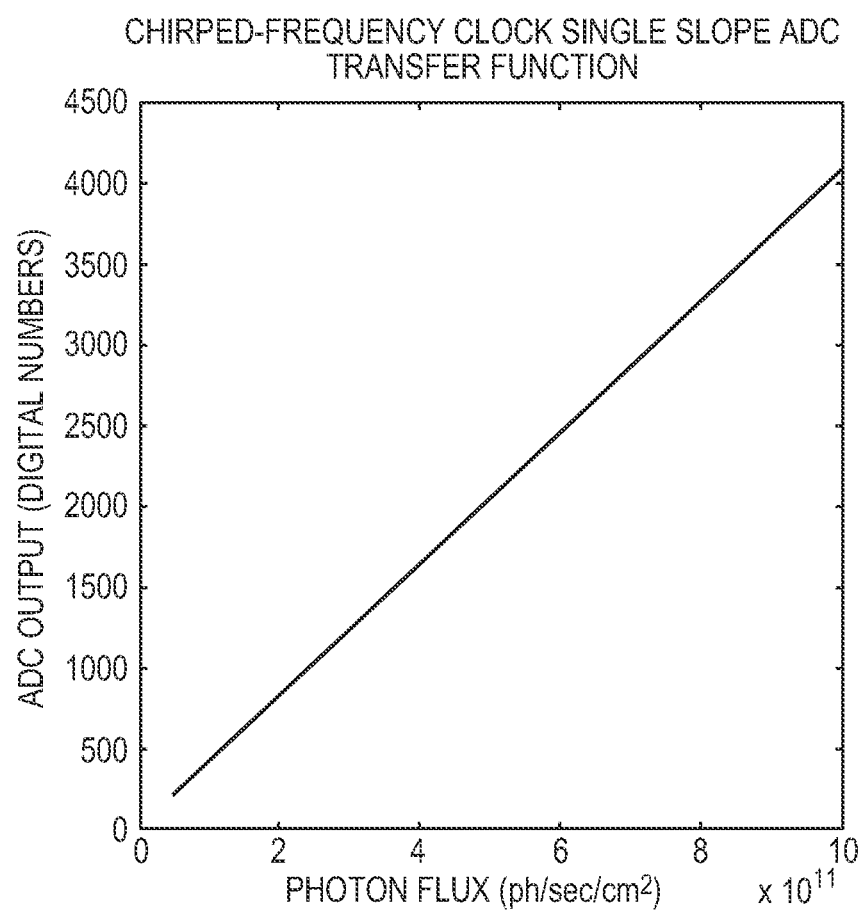
FIG. 10 is a plot of photon flux versus ADC output in accordance with the principles of the present invention.
Figure 11:
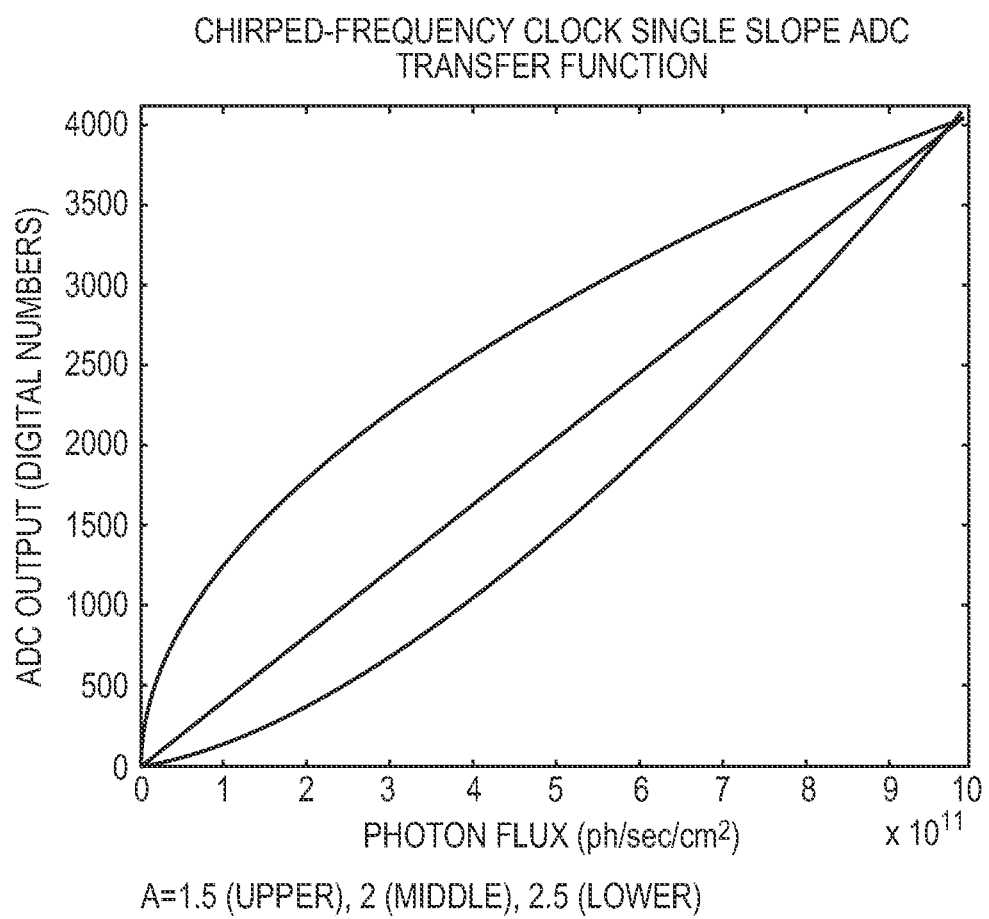
FIG. 11 is a plot of photon flux versus ADC outputs in accordance with the principles of the present invention.

A linear transfer function can be obtained with α=2, as illustrated in the graph of FIG. 10. Other arrangements can be used to gain the desired transfer function as illustrated by the traces of FIG. 11 in which, α=1.5 (upper), 2 (middle), 2.5 (bottom). A logarithmic function can also be approximated with α=1:

$$f_c(t) = \frac{f_o}{t},$$

$$N_{SSC} = (f_o \cdot \ln|t_{latch}| + const)$$

$$N_{SSCD} = 2^b - \left(f_o \cdot \ln\left(\frac{CV}{i_o + \varepsilon q\varphi A}\right) + const\right)$$

In illustrative embodiments of a digital focal plane array in accordance with the principles of the present invention, in the unit cell ADCs the charge integrated onto the integration capacitor causes a voltage to be developed on the integration node. This voltage is sensed by a comparator circuit. An illustrative embodiment of a comparator is a CMOS inverter, in which the input voltage is compared with the inverter switching threshold. Many other comparator structures are known to the art. A differential amplifier may be used to allow comparison with a reference voltage. One example of this type of configuration is an operational amplifier operated as a comparator circuit. Such a comparator may also be implemented with hysteresis.

Figure 12:
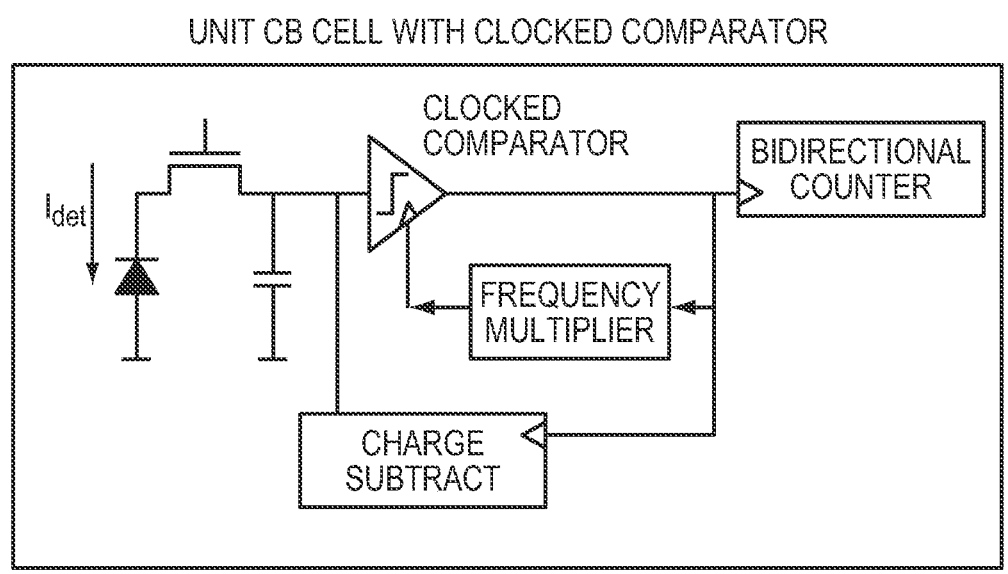
FIG. 12 is a block diagram of unit cell electronics in accordance with the principles of the present invention.

As illustrated in the block diagram of FIG. 12 in an illustrative embodiment, the comparator circuit may be clocked to reduce static power. The clock frequency must be sufficiently greater than the expected current-mode V-to-f output frequency so as to not significantly affect the quantization noise error. This clock may be globally distributed, generated in the pixel or pixel neighborhood using an oscillator circuit such as a ring oscillator, or generated locally based on the V-to-f output of the pixel. In an embodiment of the latter case, the comparator clock is a frequency multiplied version of the V-to-f clock, allowing for per-pixel adaptation of the comparator clock frequency with illumination intensity.

Figure 13:
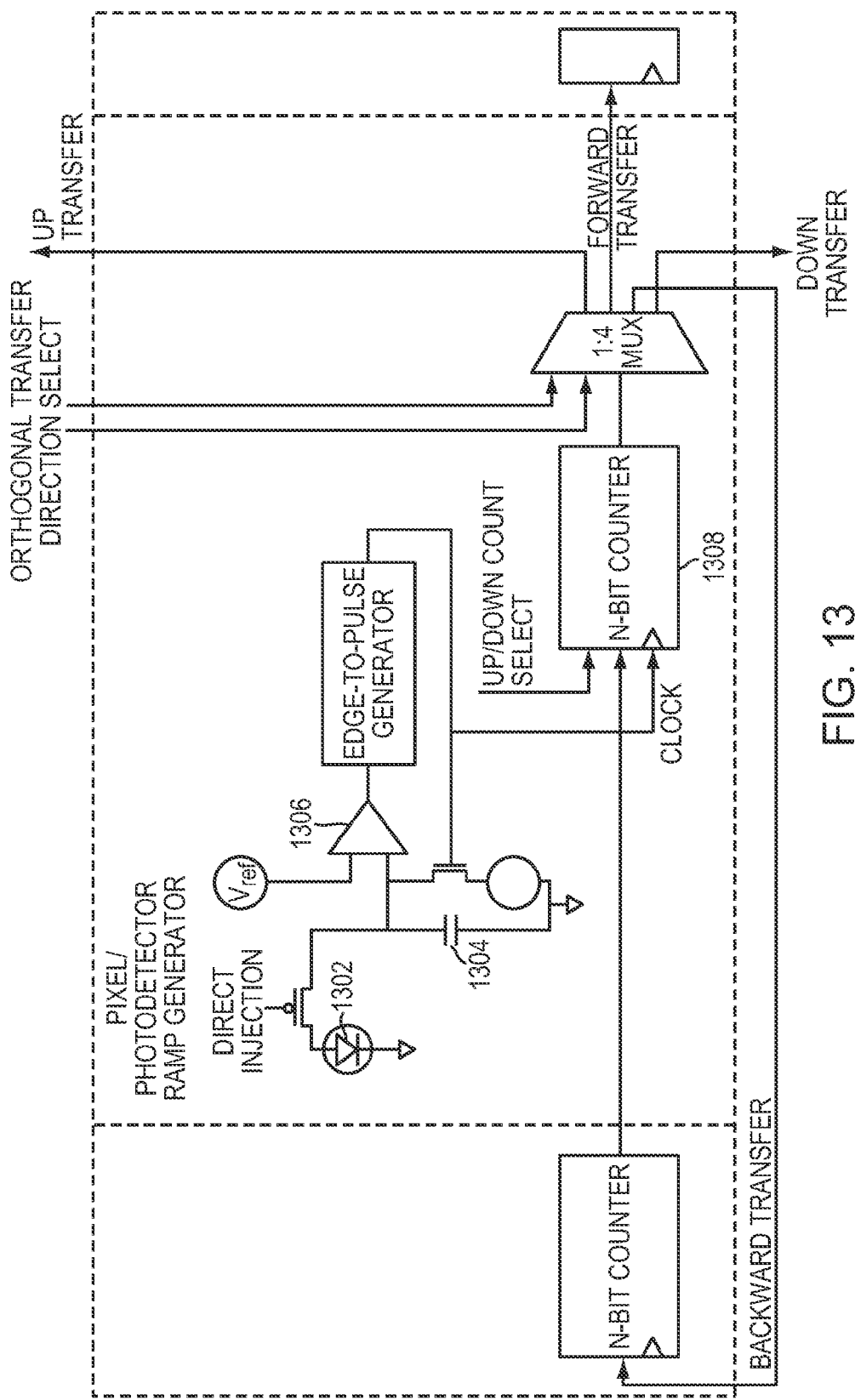
FIG. 13 is a block diagram of unit cell electronics in accordance with the principles of the present invention.

In an illustrative embodiment in accordance with the principles of the present invention, orthogonal data transfer among unit cells may be accomplished in a variety of ways. As described in the parent application to this, a 1:4 multiplexer may be employed to accomplish the orthogonal transfer. Other embodiments are contemplated within the scope of the invention. For example, counters capable of serial transfer in two directions and N-bit column parallel connections between counters may be employed. In the schematic diagram of FIG. 13, the diode current is direct-injected onto the integrator node, but other injection schemes such as buffered direct injection (BDI), share buffered direct injection (SBDI) source follower per detector (SFDI) capacitive feedback transimpedance amplifier (CTIA), etc. can also be used. These injection schemes are known in the art. In this illustrative embodiment, the photo detector 1302 generates a current proportional to the light intensity. The current is integrated onto a capacitor 1304 generating a voltage ramp. When the voltage on the capacitor reaches Vref, the comparator 1306 resets the capacitor voltage to Vrest and increments or decrements the counter 1308 by one count. Assume that the input (diode) current always is being integrated on the capacitor top plate (even in reset). When the capacitor voltage is reset, the capacitor is charged from the comparator trip point by a voltage ΔV $$\Delta V = t\_pulse * (I\_ref - I\_in)/C$$

where t_pulse is the width of a constant-width pulse generated at each comparator trigger. (This can be implemented by generating a constant width pulse at each rising comparator output edge.) Then, the integration is effected with ΔV on the cap as the initial voltage. The reference source is disconnected during integration. The comparator trip point is reached after $$T\_int = \Delta V/(I\_in/C)$$

substituting in ΔV:

$$T\_int = (t\_pulse * (I\_ref - I\_in)/C)/(I\_in/C\_int)$$

$$= t\_pulse * (I\_ref/I\_in - 1)$$

The output frequency is $$f\_out = 1/(t\_pulse + T\_int)$$

$$= I\_in/(t\_pulse * I\_ref)$$

This allows for a Current mode V-to-f that is ideally not dependent on C_int or V_ref. The count direction (increment or decrement) is controlled by the user, and input from the up/down select line. After a frame period, the count values are transferred serially out of the pixel. The 1:4 mux routes the digital values to one of four neighboring pixels, as determined by the values presented by the orthogonal transfer selection lines.

Figure 14:
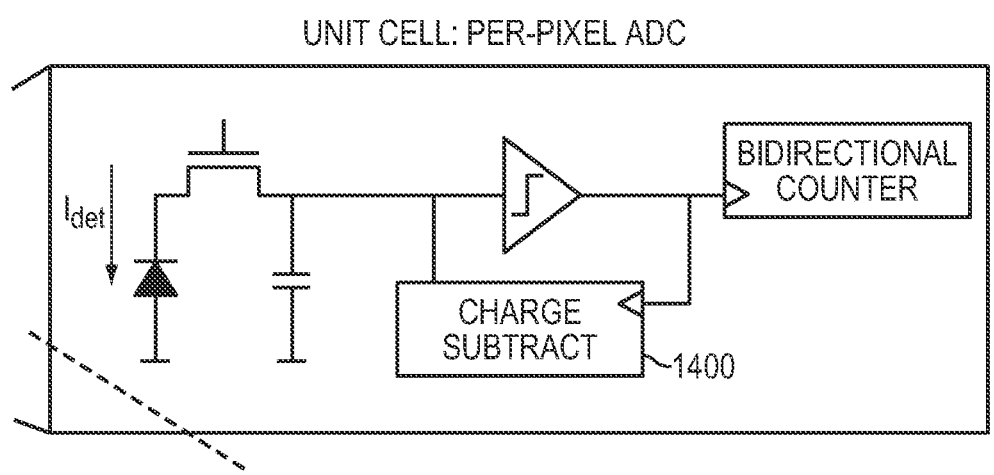
FIG. 14 is a block diagram of unit cell electronics in accordance with the principles of the present invention.

The block diagram of FIG. 14 provides a generalized view of a charge balancing ADC such as may be employed in a digital focal plane array in accordance with the principles of the present invention. A switched current source is merely one embodiment of a charge subtraction implementation 1400. This subtracted charge Q_ref is equivalent to the t_pulse*I_ref for the switched current source embodiment. Any method of subtracting a fixed charge packet from the integration node can be applied to this approach. Some alternate embodiments include, for a CCD implementation, for example, "fill and spill" charge generators, diode cutoff charge generators, and static double-sampling charge generators, and dynamic double sampling charge generators. Many commercial CMOS processes allow for formation of these charge packet generation structures. In operation with a digital focal plane array in accordance with the principles of the present invention, the charge metered out by the CCD charge generator is output onto the integration node. The polarity is selected so that the fixed charge packet it subtracted from the integrated photocurrent with each comparator trigger. CCD charge generators are known and described, for example, in, C. H. Sequin, "Linearity of electrical charge injection into charge coupled devices," IEEE J. Solid State Circuits, vol. SC-10, pp. 81-92, April 1975; and S. A Paul and H. S. Lee, "A 9-b Charge-to-Digital Converter for Integrated Image Sensors," IEEE J. Solid State Circuits, vol. 31, No. 12 Dec. 1996, which are hereby incorporated by reference.

Figure 15:
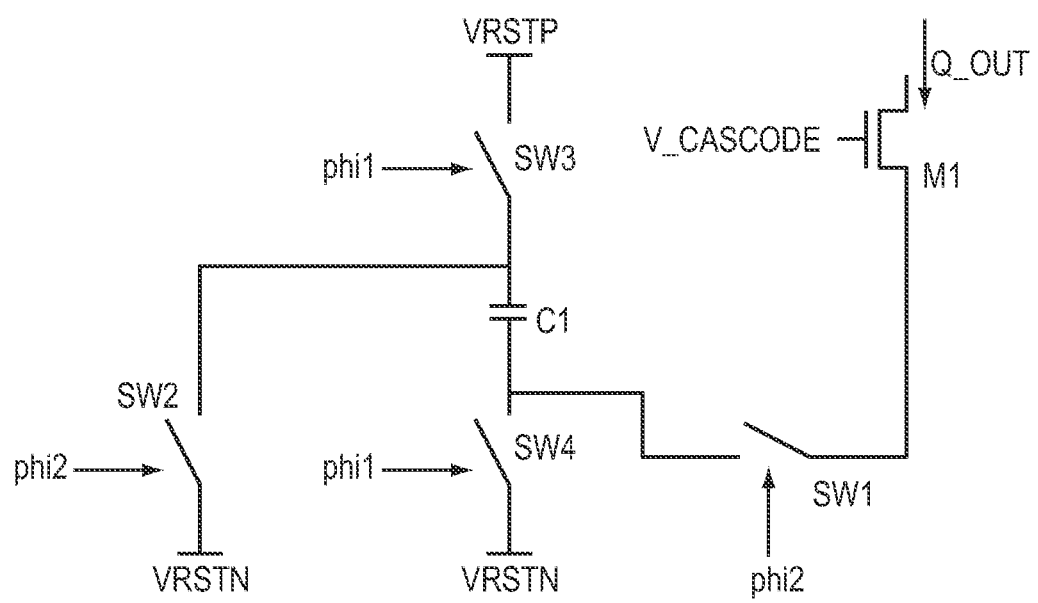
FIG. 15 is a block diagram of unit cell electronics in accordance with the principles of the present invention.

The circuit diagram of FIG. 15 provides an illustration of an alternate embodiment of a charge subtraction circuit such as may be employed in a digital focal plane array in accordance with the principles of the present invention. Clocks phi1 and ph2 are generated based on the comparator output and are non-overlapping. The switches sw1, sw2, sw3, and w4 may be implemented may be implemented as NMOS, PMOS, or CMOS passgates, for example, and the clock polarity is selected to control the passgate implementation.

During the integrated period of the pixel, ph1 is high and ph2 is low. The voltage at the source of the cascade transistor M1 is Vs_m1 V_cascode-V_th, where V_th is the threshold voltage of M1. SW1 and SW2 are open, and SW3 and SW4 are closed. C1 is thus charged to Q1 =C1 (VRSTP-VRSTN).

At a pulse event, phi1 transitions to 0 and phi2 transitions to 1. To avoid direct conduction through SW1 and SW4, this transition is non-overlapping, ensuring that both switches are off for a short duration during the transition. The charge Q1 on the capacitor C1 plus a charge sharing charge determined by Vs_m1, VRSTN, and the parasitic capacitance on the component terminals is output as Q_out.

The charge sharing charge contribution may be minimized, if desired, by generating VRSTN using a unity gain buffered version of V_m1. This unity gain buffer may be clocked or filtered to avoid passing the short-duration transient negative pulse on Vs_m1 that occurs when Q_out is output.

Figure 16A:
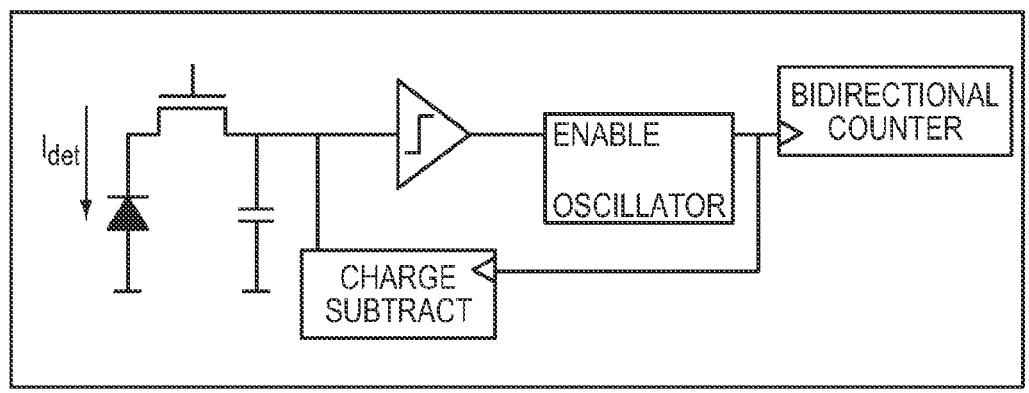
FIGS. 16A and 16B are a block diagrams of unit cell electronics in accordance with the principles of the present invention.
Figure 16B:
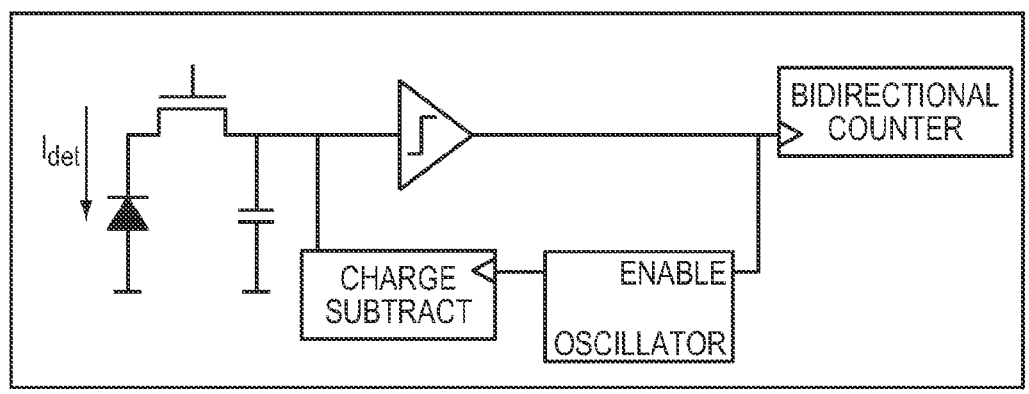

In cases where the input signal varies quickly with time, the subtracted charge may not be sufficient to un-trigger the comparator, i.e. the input to the comparator may remain high. This occurs when I>Q_ref/T_min=I_max, where T_min is the minimum charge subtraction pulse period. To accommodate this case, the comparator output may be used to control an oscillator that will repeatedly pulse the charge subtract circuit until enough charge has been subtracted. Illustrative embodiments of such charge balanced converters are depicted in the schematic diagrams of FIGS. 16A and 16B. The comparator may also pulse the counter. If the counter is pulsed, then a true measurement of a large short duration charge packet may be obtained. If it is not pulsed, then large short duration pulses are rejected. This is useful for cases such as gamma noise rejection, for example. An alternative approach is to limit the current input into the circuit to I_max, with excess current bled off. As previously described, this may be done using a clamping circuit in which the clamp path turns on when the charge subtraction circuit can no longer keep up with the input current.

A digital focal plane array in accordance with the principles of the present invention may be used to correct both pixel offset and gain non-uniformity. Offset correction is accomplished by frame differencing of the scene and reference background. Gain non-uniformity can be compensated by modulating the scene image position on the DFPA. By moving the scene and corresponding pixel array on the DFPA, the gain is averaged over several pixels. The number of positions required to compensate for gain non-uniformity depends on the statistics of the phenomenon. Widely varying gain, from pixel to pixel, will require many unique image positions. The spatial correlation length of the non-uniformity will determine the extent (Amplitude) of the modulation.

Figure 17:
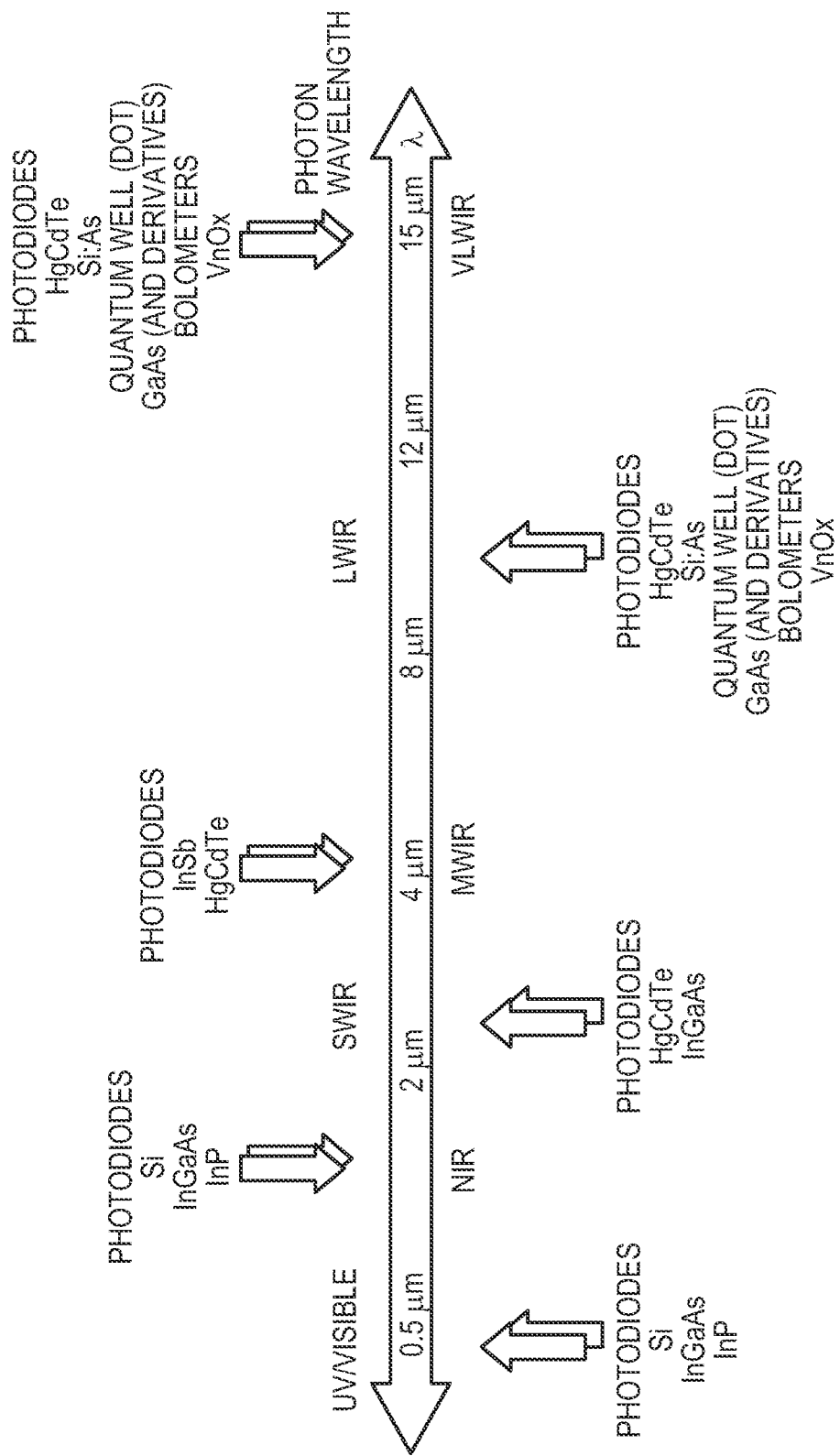
FIG. 17 is a bar chart illustrating the spectra for which a digital focal plane array in accordance with the present invention may find application.

A DFPA in accordance with the principles of the present invention may be employed in a very wide range of imaging applications across the sensing spectrum (VIS-VLWIR). In such embodiments, DFPA readout circuit is mated to the detector material appropriate to the spectral range of interest. The graph of FIG. 17 illustrates examples of detector types that may be mated with the DFPA for operation in corresponding wavelength bands. Once a detector material is chosen, particular operating parameters are determined for proper operation including: Bias voltage, Well size, Dynamic range, Bias polarity, and Integration time. Although conventional readout integrated circuits exist to support a range of applications in various spectral bands, high performance devices typically require a tailored design. In particular, it is generally not feasible to support low signal visible band applications (using a Si PIN photodiode detector array) and high signal longwave infrared applications (using a HgCdTe diode array) with the same readout device. Dynamic range considerations drive the design of the unit cell to optimize well depth and preamplifier design. With a DFPA, it is possible to build a device that can be arbitrarily configured to support high performance imaging ubiquitously. One device can support any of the common detector technologies and still perform with signal or detector limited performance. For applications requiring large well depth a V-to-F converter can be used. For low signal applications requiring small wells and very low noise, a single- (or possibly dual-) slope converter can be employed. The unit cell can be configured to operate in either configuration upon command. Also, the detector polarity (p on n or n on p diodes) can be accommodated in a similar selectable manner. Additionally, the unique orthogonal transfer and data processing capabilities of a digital focal plane array in accordance with the principles of the present invention provide capabilities, including signal processing, far beyond those of conventional readout integrated circuits.

The count sequence of a focal plane array in accordance with the principles of the present invention is, in an illustrative embodiment, configured to "wrap-around", i.e. when the digital value on the counter surpasses the maximum value allowed by the counter, M. The value following M is zero. Conversely, when counting down (decrementing the counter) and the sequence reaches zero, the next count in the sequence is M. Mathematically, a DFPA pixel digital value reports the modulus (integer remainder) after a division M, i.e. each DFPA pixel is a modulo M counter:

$$C = N \bmod (M)$$

Where C is the digital number reported by a pixel at the end of a data collect, N is the number of times the counter was triggered during the data collect, and M is the length of the counter's digital number sequence. Also, A mod(B) indicates the modulus of NB. For DFPA ripple counters, $M=2^b$, where b is the number of bits in the register. For maximum length LFSR DFPA counters $M=2^b-1$. Other designs may be employed to generate arbitrary sequence length. Counters that produce M=p*q sequence length, where both p and q are prime numbers, is potentially of particular interest for applications regarding secure transfer of information using a DFPA to encrypt/decipher data such as described below. In embodiments in which the inventive DFPA is used as an optical imager, N and M can be written in terms of photons, electrons, and detector parameters:

$$N = \mathrm{floor}\left(\frac{N_e}{G_e}\right),$$

$$M_e = MG_e$$

Where Ne is the total number of electrons counted during a frame period, Ge is the number of electrons per count, and Me is the number of electrons corresponding to counter wrap around. Ne is determined from the source and detector parameters $$N = \mathrm{floor}\left(\frac{\varphi \eta A t}{G_e}\right),$$

$$C = \mathrm{floor}\left(\frac{N_e}{G_e}\right) \bmod (M),$$

Also Note: $C \approx \left[\mathrm{floor}\left(\frac{N_e}{G_e}\right) \bmod \left(\frac{M_e}{G_e}\right)\right] G_e$ The floor function indicates that Ne is a truncated integer value. The counter only counts electrons in quanta of Ge. Electrons not counted at the end of an integration period are lost and attributed to quantization noise. Ge is the size of the least significant bit of the analog to digital converter, also the step size of the counter in electrons. The derivation of Ge depends on the exact implementation of the pixel front end. For a voltage to frequency converter front end as previously described, Ge is given by:

$$G_e = \frac{CV_{ref}}{q}$$

$$N = \mathrm{floor}\left(\frac{\varphi q \eta A t}{CV_{ref}}\right)$$

$$C = \mathrm{floor}\left(\frac{\varphi q \eta A t}{CV_{ref}}\right) \bmod (M)$$

Where C is the integration capacitance, Vref the reference voltage, q the electronic charge unit.

For a dual slope converter front end as previously described, Ge is given by:

$$G_e = \frac{i_{ref} f_{ref}}{q}$$

$$N = \mathrm{floor}\left(\frac{\varphi q \eta A t}{i_{ref} f_{ref}}\right),$$

$$C = \mathrm{floor}\left(\frac{\varphi q \eta A t}{i_{ref} f_{ref}}\right) \bmod (M)$$

As previously described, a digital focal plane array in accordance with the principles of the present invention may be configured to carry out image differencing. Image differencing is used in various applications. One such use in infrared imaging is background subtraction. The background signal is often high and non-uniform. Removal of the background is a common practice for IR image processors. Often, due to limited pixel well depth on the focal plane array imager, frames must be readout at a very high rate simply to accommodate the high background, even though the background information is ultimately disregarded. Pixel well depth is a common figure of merit for IR focal plane arrays.

Another application of image differencing is change detection. Image differencing for change detection can be used to determine the velocity of objects in a scene or to simply determine what is different in a scene from some previous reference image. The DFPA can accomplish image differencing $$A-B = A-B \mod(M), \text{ if } A-B < M$$

$$A-B \mod(M) = A \mod(M) - B \mod(M)$$

In terms of the DFPA:

$$C = \text{floor}\left(\frac{\varphi_{scene}\eta \Delta t}{G_e}\right) - \text{floor}\left(\frac{\varphi_{Back}q\eta \Delta t}{G_e}\right)$$

$$= \left[\text{floor}\left(\frac{\varphi_{scene}\eta \Delta t}{G_e}\right) - \text{floor}\left(\frac{\varphi_{Back}\eta \Delta t}{G_e}\right)\right] \mod (M)^{**}$$

$$= \left[\text{floor}\left(\frac{\varphi_{scene}\eta \Delta t}{G_e}\right)\right] \mod (M) - \left[\text{floor}\left(\frac{\varphi_{Back}\eta \Delta t}{G_e}\right)\right] \mod (M)$$

$$** \text{ if } \left[\text{floor}\left(\frac{\varphi_{scene}\eta \Delta t}{G_e}\right) - \text{floor}\left(\frac{\varphi_{Back}\eta \Delta t}{G_e}\right)\right] < M$$

By utilizing this feature of the DFPA, a virtual well depth can be defined. In conventional arrays, the well depth is the amount of charge that can be accumulated before a readout is required. The DFPA virtual well depth is also the amount of charge the can be accumulated and digitized on-chip before a readout is required. A readout is required when A−B>M. When (A−B) exceeds M, the image in not recoverable without some a-priori knowledge of the scene or other subsequent data processing performed on the image.

$$W_{Virt} = MG_e\left(\frac{\varphi_{scene}}{(\varphi_{scene} - \varphi_{Back})}\right) \text{ electrons}$$

Since the scene varies from pixel to pixel and the gain (Ge) also has statistical variation, the virtual well depth is specified for the worst case pixel:

$$W_{virt} = MG_e \big|_{min} \left(\frac{\varphi_{scene}|_{max}}{(\varphi_{scene}|_{max} - \varphi_{Back})}\right) \text{ electrons,}$$

assuming constant background flux current over the entire array.

Various properties of the architecture of a digital focal plane array in accordance with the principles of the present invention may be exploited to encrypt and decipher data. The modulo-arithmetic property of the DFPA has potential use in public key cryptology. Modulo N arithmetic is the basis of modern public key encryption schemes, such as PGP. Also, a counter such as is used in an illustrative embodiment of the DFPA may be configured as a pseudo-random number generator. As previously described, Linear Feedback Shift Registers (LFSR) may be employed as per pixel counters in the DFPA. LFSRs produce a deterministic pseudo-random count sequence and are the basis for some encryption schemes, such as stream ciphers. Since the DFPA architecture is realized as a 2-D array of digital devices that are able to communicate data with each other, the DFPA may be employed to encrypt data blocks in a manner similar to the Advanced Encryption Standard (AES) and other block cipher schemes. One advantage of using the DFPA for encryption is that it is a small compact, low power receiver device that can encrypt and decipher large amounts of parallel data quickly and without the use of an external computer. Additionally, since a DFPA is (in one embodiment) an imaging device, it may be convenient to use in practice over a free space optical link. That is, for example, the DFPA may be employed in a DFPA-based personal data device that can be used in the exchange of secure information integrated into a cell phone for example. The DFPA may operate as the imager in one capacity (i.e. for picture taking tasks), and as a secure data link to (i.e. to encrypt and decipher personal information) in another mode of operation. When coupled to a DFPA, an LED dot matrix array, LCD array, DLP, or similar array may be employed as a transmitter/modulator, for example.

A DFPA in accordance with the principles of the present invention may be configured to encrypt and decipher in both imaging and non-imaging applications. The basic difference in the two application areas is that imaging employs a passive system that uses the DFPA as a receiver to determine information about an unknown scene. Non-imaging applications employ an active source (or sources) to act as a transmitter for the DFPA receiver. In non-imaging applications, the user may have control over both the transmit and receive hardware.

Figure 18:
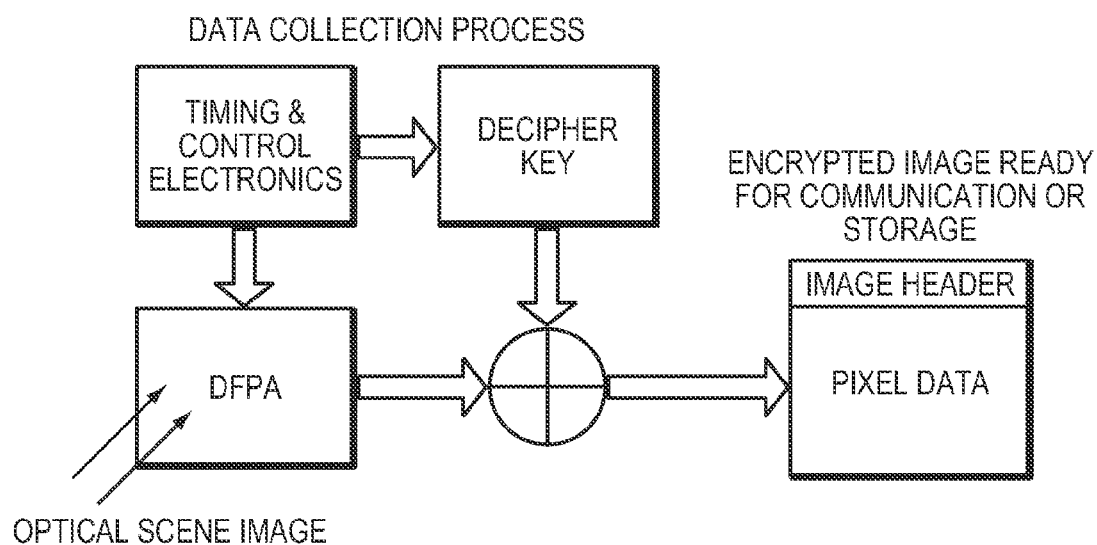
FIG. 18 is a conceptual block diagram that depicts an image encryption process employing a digital focal plane array in accordance with the principles of the present invention.

In an illustrative embodiment a DFPA in accordance with the principles of the present invention may be configured to encrypt images in real time. There are a wide variety of applications, including many commercial and personal applications, in which images may be encrypted before transmission. Since the DFPA can encrypt image data as it is collected, there is no need for additional hardware to perform this task. Current digital cameras for common personal use, for example, have no capability to secure image data. There are several possible mechanisms for encrypting image data with varying degrees of security. They may be, for example, based on pseudo-random sequence and/or Modulo N arithmetic counters. In the conceptual block diagram of FIG. 18, the DFPA is used to capture an image and to encrypt it using a decipher key and control electronics. In this illustrative embodiment, the encrypted data includes an image header and pixel data arranged according to the encryption scheme. Real-time image encryption may be implemented as follows:

1. Pseudo-random generator mechanisms for encryption:
   a. Secret but unchanging initial state
   b. Secret and unique initial state per frame
   c. Secret and unique initial state per pixel
   d. Secret and unique initial state per frame and per pixel
   e. Secret LFSR polynomial coefficients (per array or per pixel)
   f. Reconfigurable polynomial coefficients (reconfigure secretly and uniquely per array, per frame and/or per pixel)

g. Secret clocking after frame collect (similar to random initial state a-d.)
h. Clocking with secret and unique spatial patterns after frame collects.
i. Clocking with secret and unique spatial patterns and sequence count direction after frame collects.
j. Clocking with secret and unique spatial patterns and sequence count direction and unique pixel shifts after frame collects. This is akin to the convolution of secret and unique 2-D filter kernels with the image.
2. Modulo N arithmetic (with sequential or pseudo-random sequence counters)
a. Random clocking forcing multiple wrap abounds
b. Random clocking forcing multiple wrap arounds interleaved with random pixel shifts The above techniques may be combined for enhanced data protection. In each case encryption operations must be deterministic. The pattern of operations will form part of the deciphering key. The use of pseudo-random patterns offers the potential to maximize entropy making successful attacks more difficult. In each case the key can be predetermined and kept by the receiver, or even contained within an image header, i.e. a predefined set of digital words preceding the actual image data in each frame. The image header typically contains all the information needed to property display the data; pixel format (L×W), bit depth, compression information, etc. If contained within the header, the deciphering key itself should be encrypted. The image header, if required, can either be created on the DFPA device, in the DHS at the array edge, or in ancillary processors, ASICs, or FPGAs that may accompany the DFPA. The key, if required can be created in the same manner and stored in the image header. There are several possible header options:

1. No Header (rules out some image encryption schemes
2. Header with no encryption (very low security)
3. Header encoded with previously agreed upon key
4. Public key system
   a. Header encoded using Private Key (anyone with public key can read)
   b. Header encoded with Public Key (anyone with private key can read)

In general the level of encryption of the header (or at least the key) should exceed the total level of image encryption, i.e. it should take equal or more computations to crack the key then the image code. Otherwise, the key is the weak link. The image may be recovered by performing the inverse clock and shift operation, using look-up tables, and or through software algorithms. An LSFR look-up table can be used to decipher the pseudo-random sequences with known initial state. Alternatively, one can write a software function to determine the appropriate count from the LFSR final state. The clocking and shifting operations can be deconvolved from the data with known key.

Figure 19A:
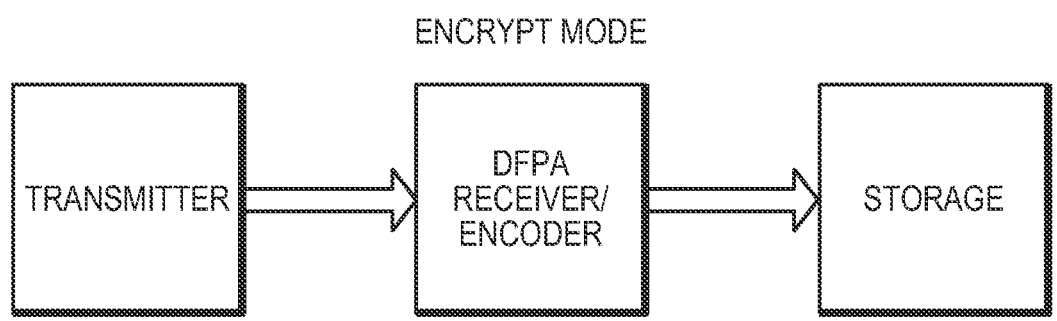
FIGS. 19A and 19B are conceptual block diagrams that illustrate the processes of encrypting and deciphering data in accordance with the principles of the present invention.
Figure 19B:
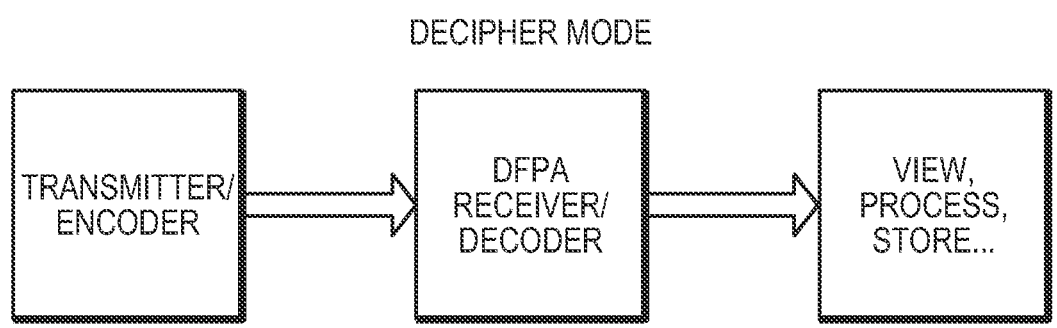

The inventive DFPA may also be employed in non-imaging encryption applications. That is, the DFPA, as an array of optical receivers, can function as the receiver in an optical communication system. In one embodiment the system can be free space optical communication system. In another embodiment, fiber optics can be used to drive the optical receivers forming each pixel. This illustrative embodiment, is described in terms of an optical system; however in another embodiment electrical signals can be delivered directly to each DFPA unit cell to drive the counters directly. The block diagrams of FIGS. 19A and 19B illustrate the configuration, respectively, of encrypting and deciphering systems employing the inventive DFPA. The DFPA may be used in a communication system to encrypt data at the receiver, without the use of computers or any additional hardware for encryption. Additionally, since the transmitter can be controlled in a non-imaging system, the wrap-around counters can be used to build a device for encrypting and deciphering data, e.g. using public key techniques.

In the data encryption mode of FIG. 19A the DFPA receives the data and performs an algorithm to encrypt the contents. After encryption, data can be read from the array and sent to a storage device for example. All of the encryption mechanisms described above for imaging systems can be applied to non-imaging systems. Additionally, the wrap-around counters Modulo arithmetic feature may be exploited more fully in non-imaging modes of operation using active transmitters. For example, a public key system can be employed by the Modulo N' counters where N'=p*q and p and q are prime numbers (preferably large prime numbers).

$$N'=p*q, \text{where } p \text{ and } q \text{ are both prime numbers}$$

$$\theta(N')=(p-1)(q-1)$$

Choose public key e, so that e is co-prime to $\theta(N')$
de≡1 mod($\theta(N')$), where d is the private key
c=$m^e$ mod(N), encrypting the cipher text message c from plain text m using the public key
m=$c^d$ mod(N') Recovery of the plaintext message using the private key In general each DFPA pixel produces $$C = \text{floor}\left(\frac{N_e}{G_e}\right) \text{ mod } (M),$$

where M may be arbitrarily controlled
Substituting $$m^e = \text{floor}\left(\frac{N_e}{G_e}\right),$$

$$N' = M$$

For V-2-F implementation $$C = \text{floor}\left(\frac{\varphi q \eta A t}{CapV_{ref}}\right) \text{ mod } (M),$$

$$m = \text{floor}\left(\frac{\varphi q \eta A t}{CapV_{ref}}\right),$$

$$m^e = \text{floor}\left(\left[\frac{\varphi q \eta A t}{CapV_{ref}}\right]^e\right)$$

The multiplication can be controlled in an optical communication embodiment by controlling $\phi$, t, Vref, and possibly the capacitance Cap. Any or all variables could possibly be controlled for the appropriate result. Important considerations are the dynamic range of the source and time required to raise m to large powers. Also, it may not be necessary to use very large primes for some applications, and also it may be possible to use a different key for every pixel for very high security using relatively small prime numbers. In cases where there is only a small amount of data transfer (e.g. transferring bank account information through a personal secure data communicator) large primes and long integration times may be acceptable.

Data deciphering functions in the same way as image recovery unless using prime factorization public key methods. When using the counters for modulo N' arithmetic to encrypt data according to a public or private key, the decipher operation is the same as the encryption operation, only the inverse key must be used. If the public key was used for encryption, then the private key must be used for deciphering:

$$c^d = \text{floor}\left(\left[\frac{\varphi\eta At}{CapV_{ref}}\right]^d\right)$$

Figure 20:
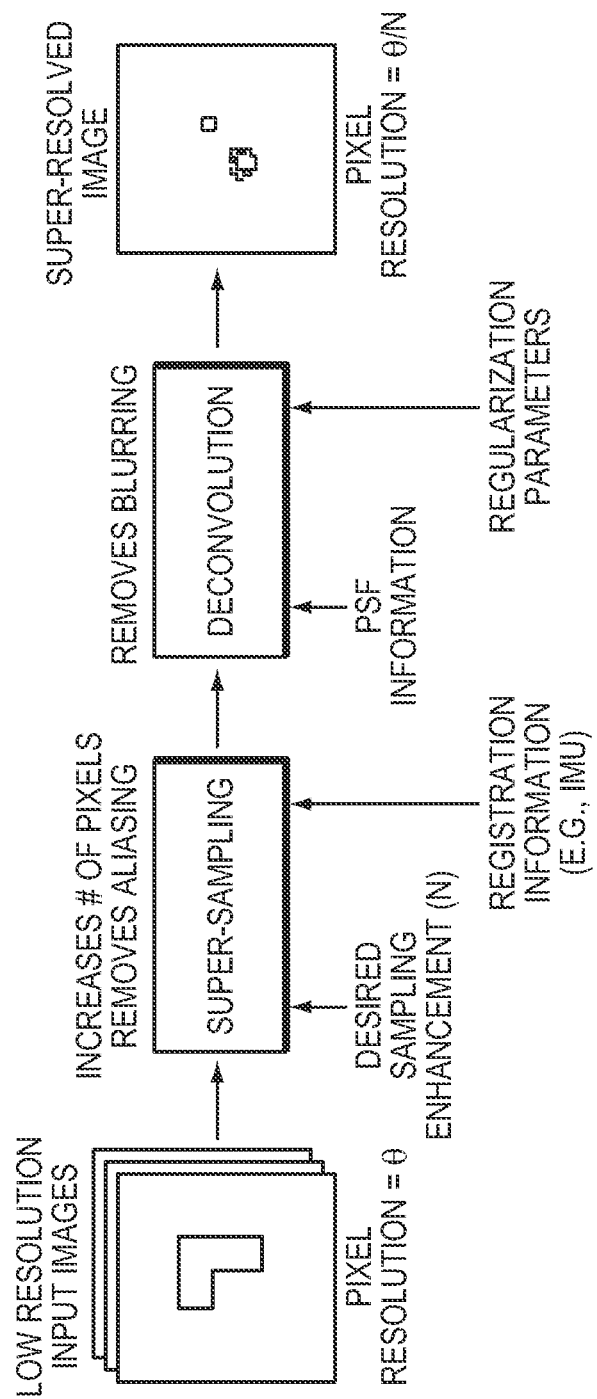
FIG. 20 is a conceptual diagram of a super-resolution process in accordance with the principles of the present invention.
Figure 21:
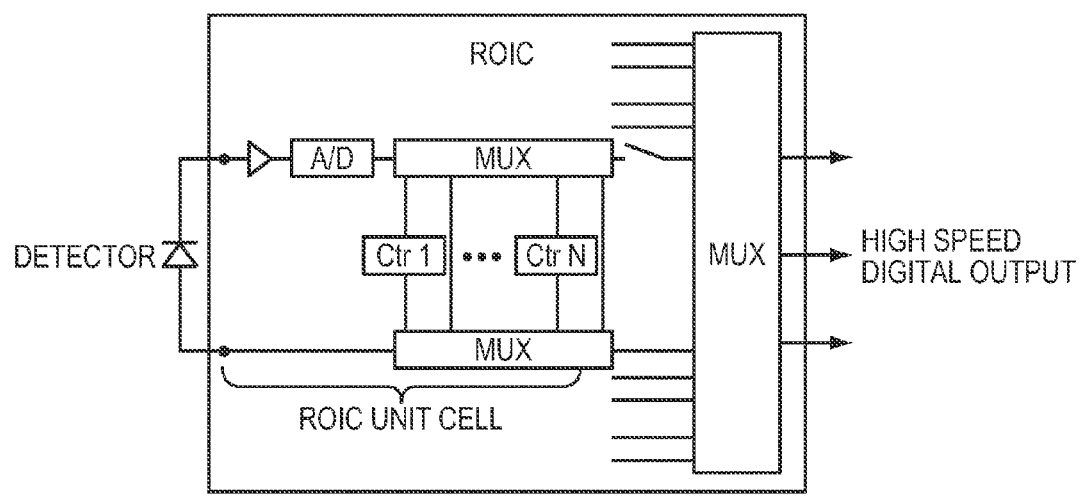
FIG. 21 is a conceptual block diagram of a readout circuit in accordance with the principles of the present invention.

A digital focal plane array in accordance with the principles of the present invention may be configured to emulate a larger format device using, for example, a superresolution method. In an illustrative embodiment of a DFPA, a CMOS readout integrated circuit may be bump-bonded onto an array of detectors. A readout integrated circuit in accordance with the principles of the present invention may be employed to generate a large format, high resolution image from a sequence of sub-sampled (lower resolution) images (e.g. a 256×256 device can emulate a higher resolution 512×512 device); the steps are illustrated conceptually in FIG. 20. A readout integrated circuit in accordance with the principles of the present invention allows a single pixel (unit cell) counter to be shared among 4 or more virtual pixels; the available dynamic range (i.e., bits) within a single ROIC unit cell can therefore be optimized between intensity dynamic range and spatial resolution. FIG. 21 is a conceptual block diagram of such a ROIC and, in particular, unit cell. In the illustrative embodiment of FIG. 21, the device is a series of multiplexed counters; depending on the state of the multiplexers, the counters can operate as a single device (conventional operation), or as separate and distinct counters whose selection is determined off-chip. This latter mode of operation enables the development of a large format virtual array.

For example, in an illustrative embodiment in which the ROIC includes 4 multiplexed counters at each unit cell, an initial image is collected using counter 1. The camera line-of-sight is then shifted ½ a pixel to the right and a 2nd image is collected using counter 2. This process is repeated for ½ pixel shifts up, left, and down; 4 images are thereby collected with the 4 counters per pixel. The inventive ROIC may take advantage of the fact that the fractional pixel shifts result in correlated pixel values—this can be exploited to minimize the bit depth associated with each counter thereby reducing the required total bits per unit cell. A deconvolution operation per nominal DFPA operation can then be applied on-chip (prior to readout).

In illustrative current to frequency ADC implementations described herein, the LSB for a given pixel is determined by the size of a full integration well. Thus, residual charge at the end of a measurement period that is insufficient to trigger a pulse is either lost or is integrated into a subsequent frame. This results in a quantization noise contribution. For larger integration capacitors, the size of an LSB increases.

For an application that uses the orthogonal transfer register structure to implement an operation that sums time delayed integrations in different pixels, a larger integration capacitor may be enabled by using a CCD well as the dominant component of the integration capacitance. The fixed plate of the integration capacitor then becomes a clocked CCD gate that can be used to move any residual charge into a CCD shift register. This residual charge may then be transferred along with the digital value, via a CCD shift register. This can allow for larger integration capacitors to be used without increasing the effective LSB of a TDI operation.

Integration and data processing functions of a DFPA in accordance with the principles of the present invention may be broken down into a chronological sequence of operations. The sequence of operations can be derived real-time or stored in a memory. Operations include bidirectional counting, orthogonal transfer of the digital array, band selection, misc control, and data readout. Each instruction may consist of an 8-bit word. The 8-bit word forms a control register. The control bits are configured to drive the DFPA clock and control inputs through logic functions. The 8-bit register controls the function of the DFPA by signaling the appropriate configuration of the OTS and bidirectional counters.

In this illustrative embodiment, when INT goes high, the counters accumulate the digital signal. The time period for INT-high is either predetermined or controlled real-time by ancillary sensors and equipment. Predetermined integration functions can be programmed into a clock and supplied to the DFPA (static processing operations). When INT goes low an FPGA reads the control word and goes through the appropriate logic in order to command the DFPA counters and OTS prior to the next frame period. Possible commands are: Up/Down & Enable, Left/Right & Enable, Increment/Decrement, Readout. Upon Readout the entire array of digital numbers is read from the DFPA to a data collection system. An example of an 8-bit control register is shown below.

Bit(0)=Enable Up/Down Shift
Bit(1)=Shift Up=1, Shift Down=0
Bit(2)=Enable Left/Right Shift
Bit(3)=Shift Right=1, Shift Left=0
Bit(4)=Readout
Bit(5)=Count Down=1, Count Up=0
Bit(6)=Spare
Bit(7)=Spare When Bit(0) is high at the end of an integration period, the OTS shifts the entire contents of the digital number array that is stored in unit cells up or down. Bit(1) controls the direction; if Bit(1) is high the array shift up one row. If it is low, the array shifts down one row. Left/right shifts are controlled in exactly the same manner with Bit(2) and Bit(3). Bit(5) controls the count sequence direction, increment or decrement (add or subtract counts from the register). When Bit(5) is high, a count will be added to the digital counter at every comparator trigger. If Bit(5) is low, a count is subtracted from the counter. Bit(4) controls the readout. When Bit(4) is high, the entire contents of the digital array are read off the chip. Bit(6) and Bit(7) are reserved as spares, possibly for external control, for example.

Figure 22:
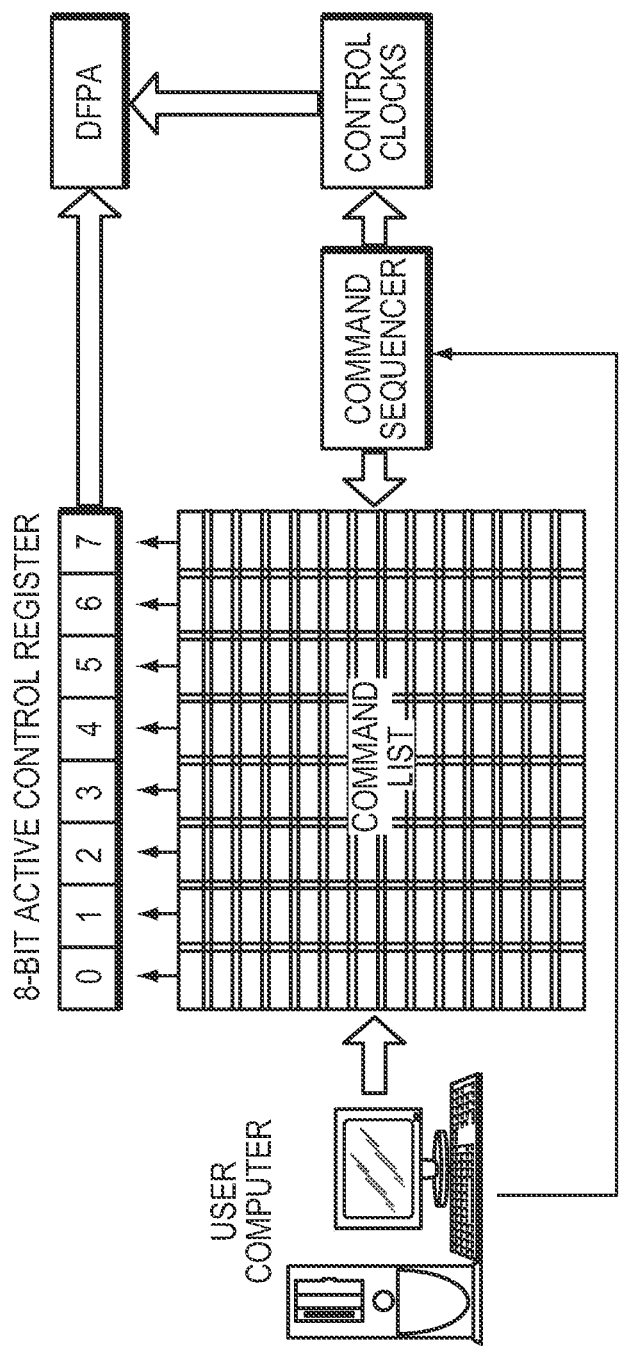
FIG. 22 is a conceptual block diagram of a data handling structure in accordance with the principles of the present invention.

The implementation of a loadable memory, illustrated in the block diagram of FIG. 22, allows the implementation of a user defined sequence of commands for static data processing operations, e.g. image processing filter kernels. In an illustrative embodiment, the memory includes a list of control register commands for the DFPA. Upon completion of each integration period, separately supplied to both the DFPA and the control computer, the next line is loaded into the active register. The list of FIG. 23 corresponds to the high pass filter kernel shown. The integration time is in arbitrary time units. The control computer is programmed to repeat the sequence on every readout (Bit(4)=1). The data read from the imager will be high pass filtered on readout.

Figure 24:
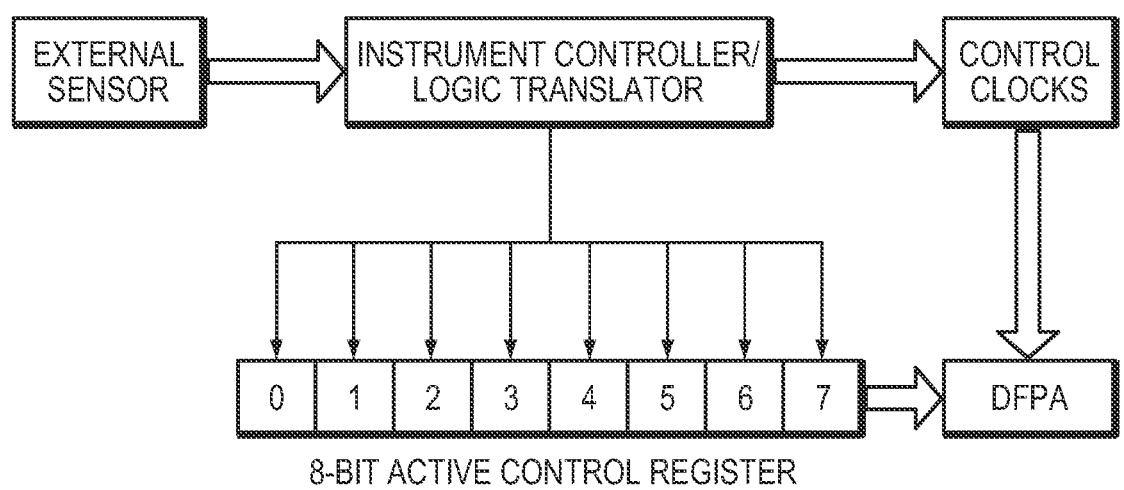
FIG. 24 is a conceptual block diagram of a data handling structure in accordance with the principles of the present invention.

It may be advantageous to dynamically control the operations of the DFPA. Applications like image stabilization and time domain integration require feedback from an external sensor to properly command the DFPA operation. In accordance with the principles of the present invention, dynamic control may be accomplished, as illustrated in the conceptual block diagram of FIG. 24, by connecting a monitoring device, e.g. an IMU for image stabilization, to the DFPA's control register though a logic translator. The IMU can determine angular displacement of the FOV, and magnitude of correction needed. A translator must calculate the appropriate number and direction of shifts on the digital focal plane array orthogonal transfer structure in-order-to compensate for unwanted scene motion. In this illustrative embodiment, the translator determines the sequence and loads commands to the DFPA, synchronously with the integration control and readout clocks.

The counters in the DFPA's unit cells may be implemented in a variety of ways. Bidirectional counting may be implemented by using a counter architecture that itself can count up and down, or by using a unidirectional counter and complementing the data using a complement function such as a one's complement function or a two's complement function. For example, in the one's complement case, one may implement background subtraction by counting up proportionately to the background, complementing the contents of the pixel register, then counting up proportionately to the signal.

Counters may be implemented as ripple counters, linear feedback shift registers (which give a pseudorandom count), Gray counters, or any other type of counter. Parity schemes, hamming codes, and other error detection and correction techniques may be co-integrated with the pixel array registers to provide robustness against data corruption (such as due to single event upsets.) An error correction circuit may be implemented to correct errors at the pixel level in parallel with the array operations.

In one real-time counter implementation, a parity check is added within the pixel such that the pixel can detect an error within its register. When a failure is detected, an error state is asserted by the pixel, thus directing a series of corrective measures. In many cases, the first action upon detection of an error will be to stop the counter pending remediation. In one embodiment, the corrective measure may be that the assertion of an error flag bit is detected by an error correction circuit. This error correction circuit may be physically located outside the pixel and may be shared by multiple pixels. The assertion may be detected by a polling or interrupt based scheme. Upon detection of the error flag by the error correction circuit, the pixel is accessed, for example via a mux structure), and the pixel data value is corrected. In another embodiment, the corrective measure may be for a pixel to copy the data from an adjacent pixel into itself.

Data correction due to single event effects may also be mitigated through the use of redundancy. For example dual interlocked storage cells (DICE) or single event resistant topology (SERT) cells may be used to construct the register. Temporal and spatial redundancy may be implemented to mitigate single event upsets and single event transients, both of which can cause soft errors. Spatial redundancy may be implemented, for example, by replicating critical nodes three times and using a majority circuit to ignore corrupt values. Temporal redundancy may be implemented, for example, by sampling the input at different time intervals greater than the maximum width of a single event transient. Passive filter structures may also be added to critical nodes to filter out single event transients.

In accordance with the principles of the present invention, a memory array may be overlayed onto the pixel array (e.g., ROIC). This may be an SRAM, DRAM, register file, shift register etc. This may be implemented by placement of the memory cells within the pixel array, collocated upon the ROIC. This memory array may be used to direct pixel array operations. In one application, the memory array may be used to disable the counters within a pixel. In another application, these may allow for variation of the gain of the pixel. In another application, the shift direction for the orthogonal transfer structure to be implemented by the orthogonal transfer structures may be programmed into the memory. This may be used to implement arbitrary shifting of data. For example, data may be rotated about a point using a sequence of arbitrary shifts or one may compensate for optical distortion in real time by using a directed sequence of arbitrary shifts. In an illustrative embodiment, orthogonal transfer structures or arbitrary transfer structures are built into the memory overlay structure. For example, by using orthogonal shifts and/or arbitrary shifts, a particular portion of the memory may be kept aligned with the centroid of a target such as a resolved target. This memory data and the target data may then be used in an in-pixel operation. Many mathematical operations can be performed using these two data. For example, the memory data may indicate a threshold against which the image data can be compared, or the memory data may contain a pixel gain that should be applied to a particular location on the imaged object. Particular locations on a piece of machinery or a product in fabrication may be used to identify anomalous temperature profiles that may be indicative of an imminent failure or a defect, perhaps related to a thermally dependant process.

In addition to the imaging applications described herein, some of these techniques have applications that extend beyond the field of imaging. For example, an array of thin film gas (or odorant) sensors in which the conductivity of each thin film "pixel" changes in the presence of particular ambient gases may be mated with a digital pixel array ROIC in accordance with the principles of the present invention. For example, metal oxide semiconductors and organic thin film semiconductors may be used in such an application. If the composition, thickness, or structure of each sensor in the array of thin film gas sensors is varied across the array, then different gases will produce a different spatial "image" pattern in the digital pixel array. By programming a gain and threshold into each pixel using a memory overlay, a broadcast assertion may be generated by particular pixels in the presence of particular gases. These much compressed responses then may be treated using logic to notify an operator that a particular species has been detected. Such a system has the benefit of being easily field trainable to be applied to a wide variety of environments and sensing applications. The disclosed up/down counter scheme can allow for differential comparison of two gas flows switched by a valve, for example. Programming of the gains and thresholds may be done using a semi-automated training procedure whereby multiple flows are tested and gains and thresholds are adjusted using an optimization algorithm such as simulated annealing to maximize the detection/false alarm ratio.

An adder circuit is integrated at the orthogonal transfer structure input of the pixel register in accordance with the principles of the invention. When performing ordinary orthogonal transfers, data is simply shifted in, i.e. the adder is bypassed. When performing arbitrary transfers, data from two pixels may be consolidated (or binned) into a single pixel by adding the contents of the source pixel to the contents of the destination pixel. Such operation may be employed, for example, in adaptive optics applications. For cases where the contents of a pixel are to be divided between multiple pixels, a division operation may be implemented within a pixel register structure. One embodiment of this is to take a binary ripple counter implementation and allow for a bitwise shift operation. For example, shifting by one bit can implement a divide by two operation. By combining this with an arbitrary shift, the integrated signal in one pixel may be divided evenly between two pixels. This method may also be employed in adaptive optics applications. These more complex arithmetic operations may be directed by using a memory overlay that can be quickly written during focal plane operation.

In accordance with the principles of the present invention, various ADC configurations may be employed to overcome difficulties presented by the relatively small signal presented in the VIS band. Such ADC configurations include V to F variants, and integrating ADC approaches. FIGS. 25 through 28 are block diagrams that illustrate some of those variants. Each approach can be corrected for gain and off-set non-uniformity correction.

Figure 25:
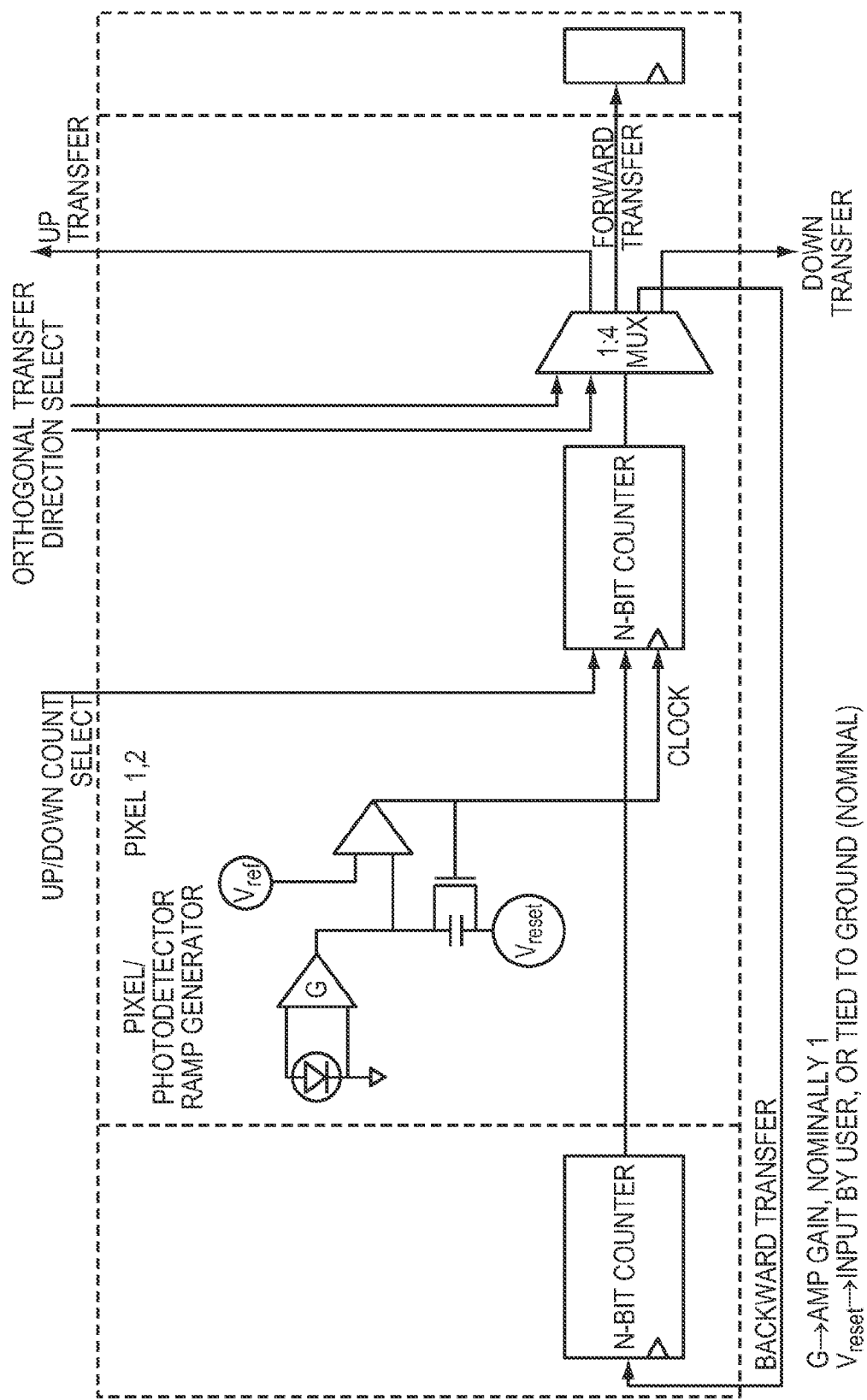
FIG. 25 is a conceptual block diagram of unit cell electronics in accordance with the principles of the present invention.

In the illustrative embodiment of FIG. 25, the ADC capacitor is reset to Vreset. The previous illustrative embodiments reset the capacitor to ground. This concept allows one to reduce the ADC least significant bit by resetting to Vreset which is set to a value between ground and Vref. Setting Vreset to 0V is equivalent to a previously disclosed embodiment. Note that the 1:4 Mux is only one way to accomplish orthogonal transfer. There are several other viable approaches, including counters capable of serial transfer in two directions and N-bit column parallel connections between counters.

In operation, the photo detector generates a current proportional to the light intensity. The current is integrated onto a capacitor generating a voltage ramp. When the voltage on the capacitor reaches Vref, the comparator resets the capacitor voltage to Vrest and increments or decrements the counter by one count. The count direction (increment or decrement) may be controlled by the user, and input from the up/down select line. After a frame period, the count values are transferred serially out of the pixel. The 1:4 mux routes the digital values to one of four neighboring pixels, as determined by the values presented by the orthogonal transfer selection lines.

Figure 26:
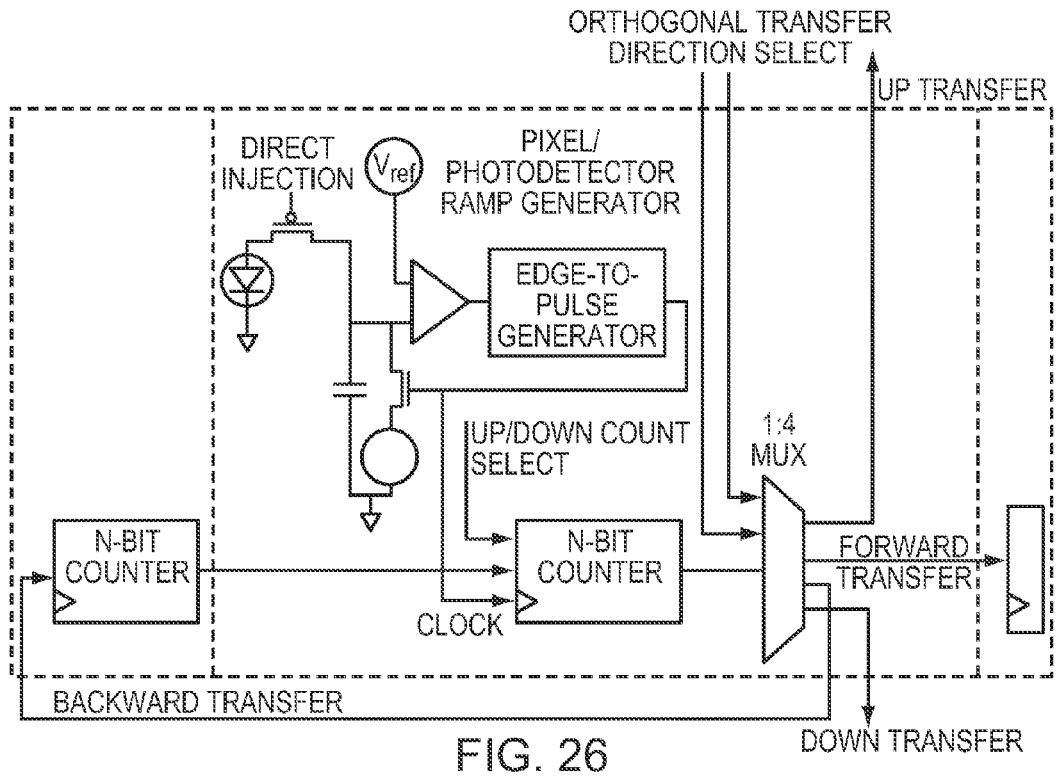
FIG. 26 is a conceptual block diagram of unit cell electronics in accordance with the principles of the present invention.

Turning now to the illustrative embodiment of FIG. 26, the diode current is direct-injected onto the integrator node, but other injection schemes such as BDI, SBDI, CTIA, etc. can also be used. These injection schemes are known in the art. Note that the 1:4 Mux is only one way to accomplish orthogonal transfer. There are several other viable approaches, including counters capable of serial transfer in two directions and N-bit column parallel connections between counters.

In operation, the photo detector generates a current proportional to the light intensity. The current is integrated onto a capacitor generating a voltage ramp. When the voltage on the capacitor reaches Vref, the comparator resets the capacitor voltage to Vrest and increments or decrements the counter by one count. Assume that the input (diode) current always is being integrated on the capacitor top plate (even in reset). When we reset the capacitor voltage, we charge the capacitor from the comparator trip point by a voltage ΔV $$\Delta V = t\_pulse*(I\_ref - I\_in)/C$$

where t_pulse is the width of a constant-width pulse generated at each comparator trigger. (This can be implemented by generating a constant width pulse at each rising comparator output edge.) Then, we do our integration with ΔV on the cap as the initial voltage. We disconnect the reference source during integration. We reach the comparator trip point after $$T\_int = \Delta V/(I\_in/C)$$

So substituting in ΔV:

$$T\_int = (t\_pulse*(I\_ref - I\_in)/C)/(I\_in/C\_int)$$

$$= t\_pulse*(I\_ref/I\_in - 1)$$

The output frequency is $$f\_out = 1/(t\_pulse + T\_int)$$

$$= I\_in/(t\_pulse*I\_ref)$$

This allows for a V-to-f that is ideally not dependent on C_int or V_ref. The count direction (increment or decrement) may be controlled by the user, and input from the up/down select line. After a frame period, the count values are transferred serially out of the pixel. The 1:4 mux routes the digital values to one of four neighboring pixels, as determined by the values presented by the orthogonal transfer selection lines.

Figure 27:
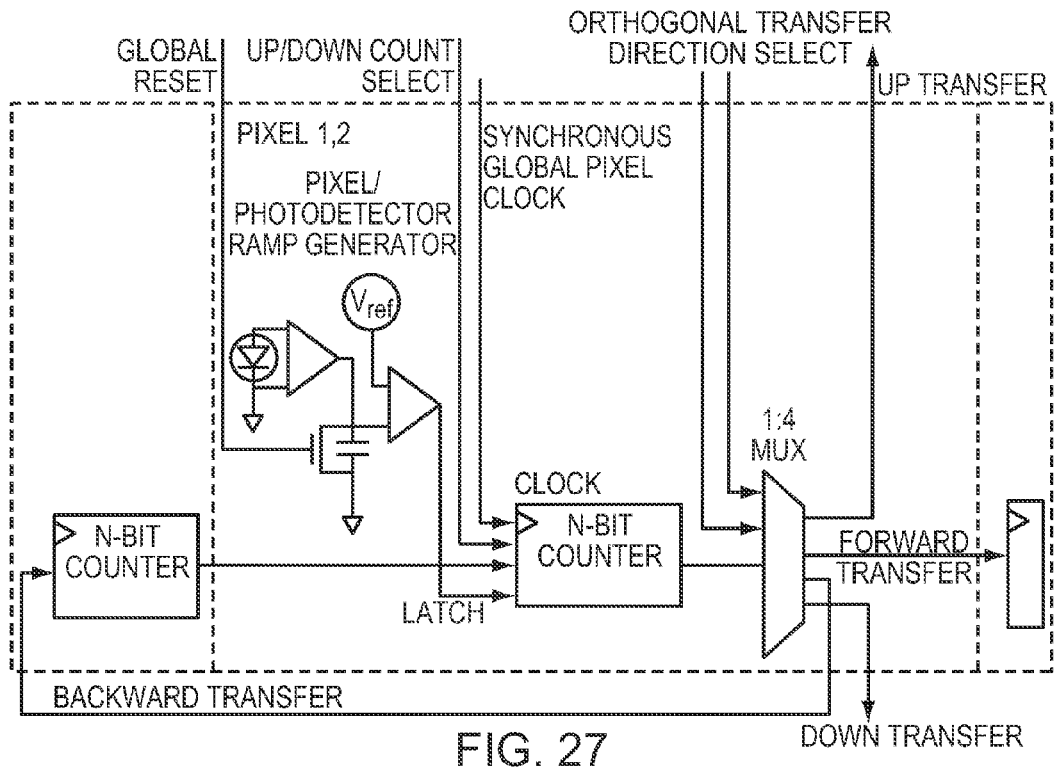
FIG. 27 is a conceptual block diagram of unit cell electronics in accordance with the principles of the present invention.

In the illustrative single slope ADC embodiment of FIG. 27, the photo detector generates a current proportional to the light intensity. The current is integrated onto a capacitor generating a voltage ramp. An off-chip clock drives the counter. When the voltage on the capacitor reaches Vref, the comparator latches the count value. The count direction (increment or decrement) is controlled by the user, and input from the up/down select line. After a frame period, the count values are transferred serially out of the pixel. The 1:4 mux routes the digital values to one of four neighboring pixels, as determined by the values presented by the orthogonal transfer selection lines. Note that the 1:4 Mux is only one way to accomplish orthogonal transfer. There are several other viable approaches, including counters capable of serial transfer in two directions and N-bit column parallel connections between counters.

Figure 28:
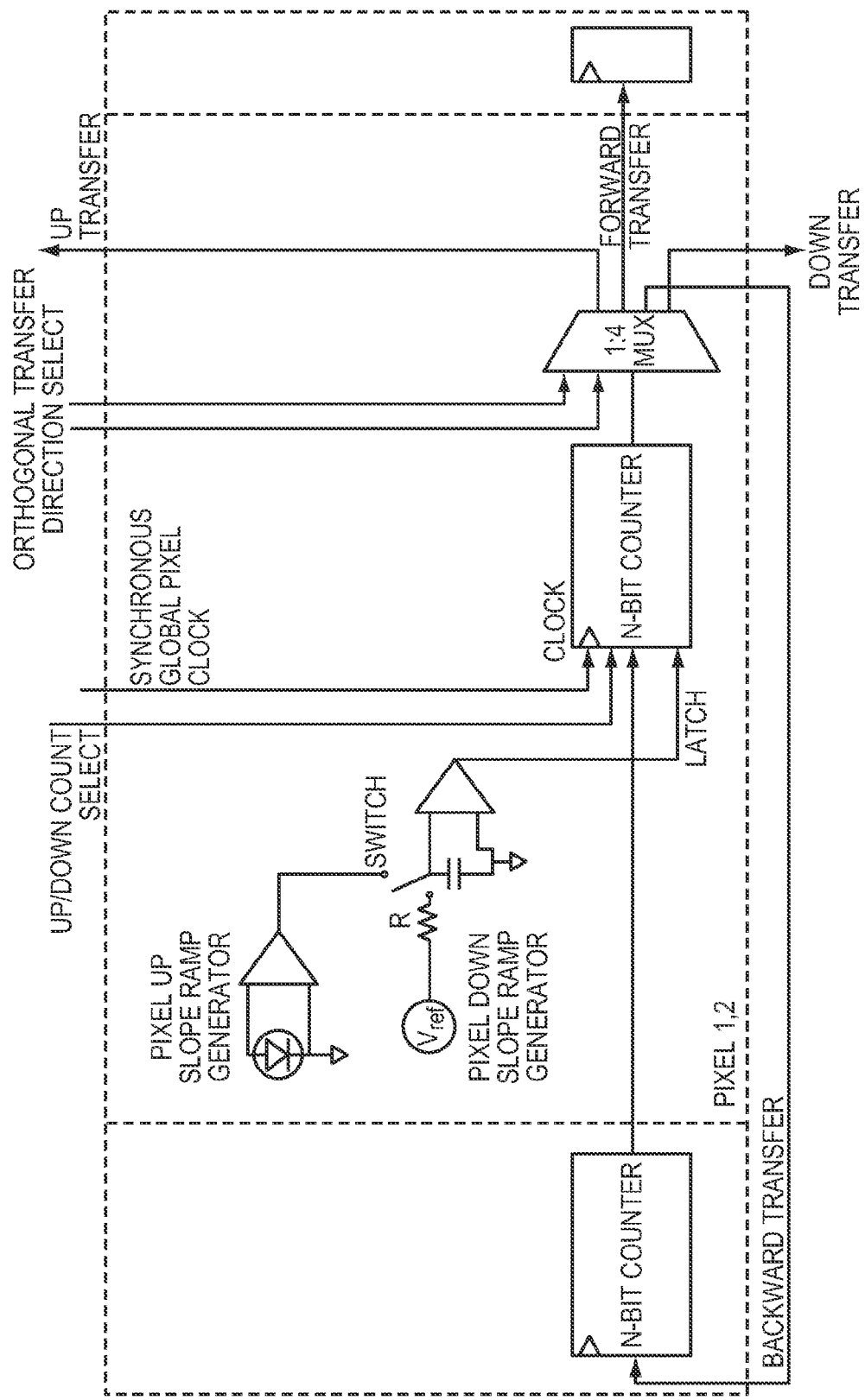
FIG. 28 is a conceptual block diagram of unit cell electronics in accordance with the principles of the present invention.

In the illustrative dual slope integrating ADC embodiment of FIG. 28 the photo detector generates a current proportional to the light intensity. The current is integrated onto a capacitor for a predetermined period of time. The time period is measured by the same off-chip clock eventually used to clock the ADC counter. The capacitor ramp voltage increases according to the incident light intensity during this period. Following the integration period, the capacitor is set to discharge through R. An off-chip clock drives the counter during this period, measuring the time to discharge the voltage to Vref. When the voltage on the capacitor reaches Vref, the comparator latches the count value. The count direction (increment or decrement) is controlled by the user, and input from the up/down select line. After a frame period, the count values are transferred serially out of the pixel. The 1:4 mux routes the digital values to one of four neighboring pixels, as determined by the values presented by the orthogonal transfer selection lines. Note that the 1:4 Mux is only one way to accomplish orthogonal transfer. There are several other viable approaches, including counters capable of serial transfer in two directions and N-bit column parallel connections between counters.

Figure 29:
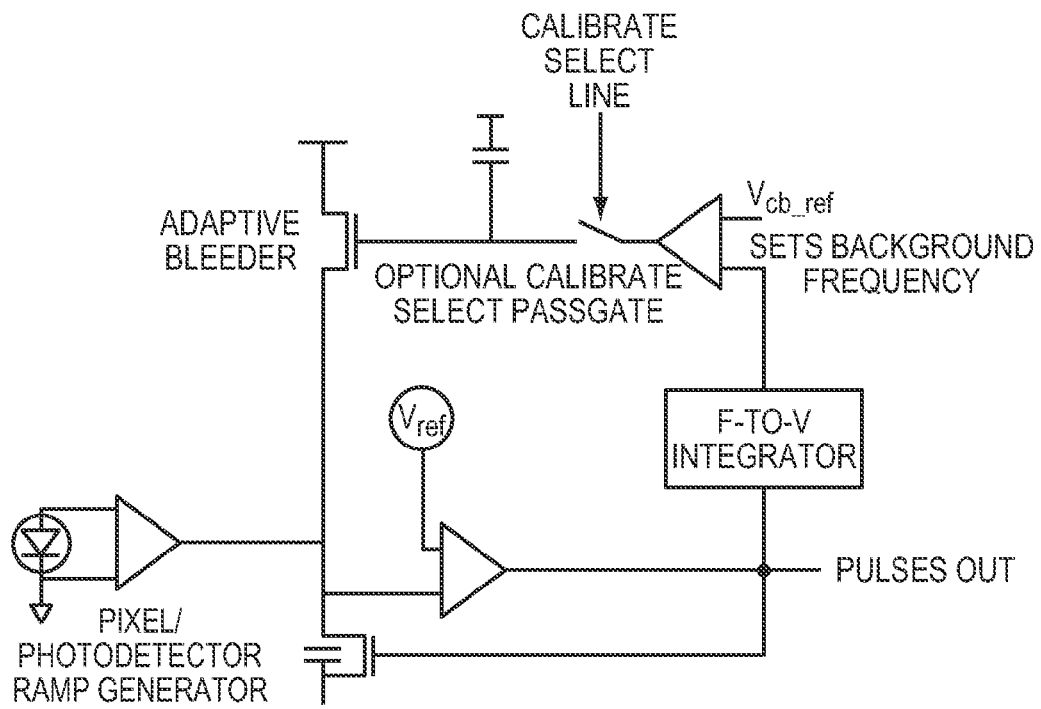
FIG. 29 is a conceptual block diagram of unit cell electronics in accordance with the principles of the present invention.
Figure 30:
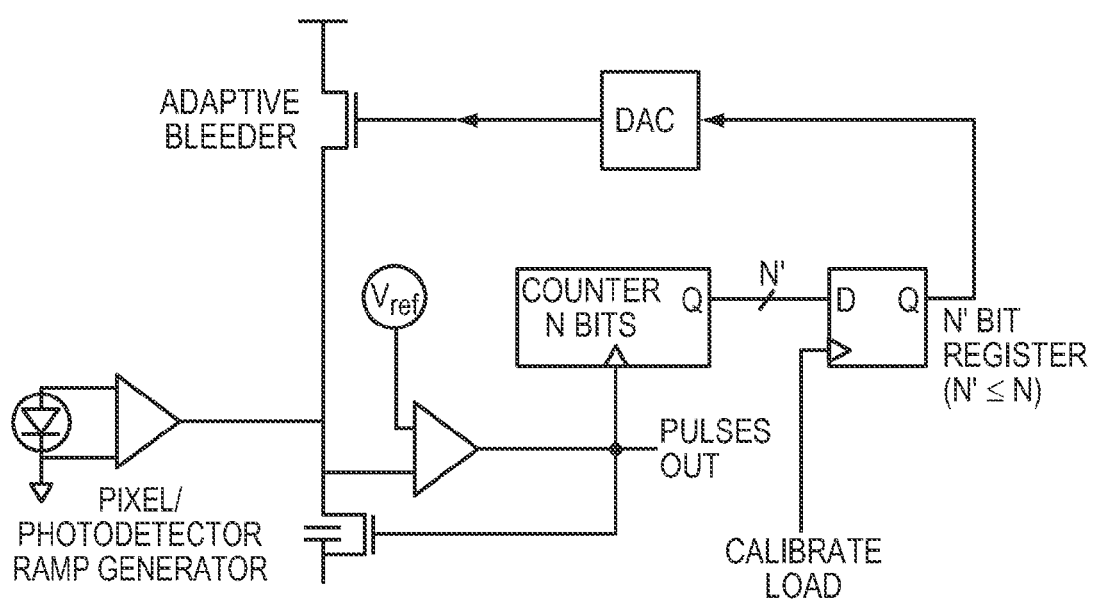
FIG. 30 is a conceptual block diagram of unit cell electronics in accordance with the principles of the present invention.
Figure 31:
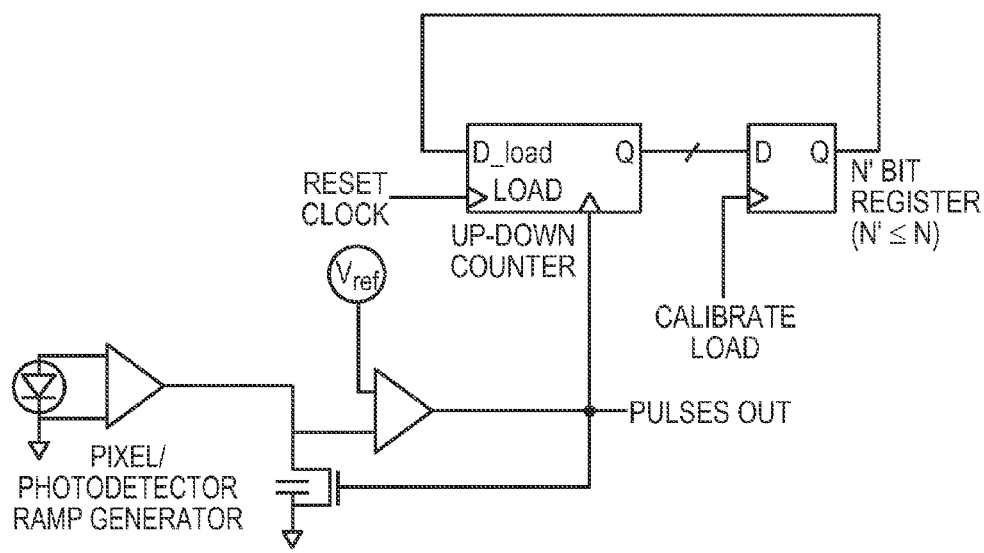
FIG. 31 is a conceptual block diagram of unit cell electronics in accordance with the principles of the present invention.

In the illustrative embodiment of FIG. 29, an adaptive bleeder circuit is added for offset non-uniformity compensation The capacitor plus integrating feedback amplifier output resistance or slew rate determines adaptation time constant. For longer adaptation times, this can be switched between calibrate and measure modes by adding an optional passgate to the feedback amp output. Depending on mode of operation, this can be used for either dark current or background signal subtraction. The circuit of FIG. 30 may be used to cancel constant analog dark current. The counter may be used for both calibration and data collection. The circuit of FIG. 31 may be used for pulsed digital dark current compensation.

Figure 32:
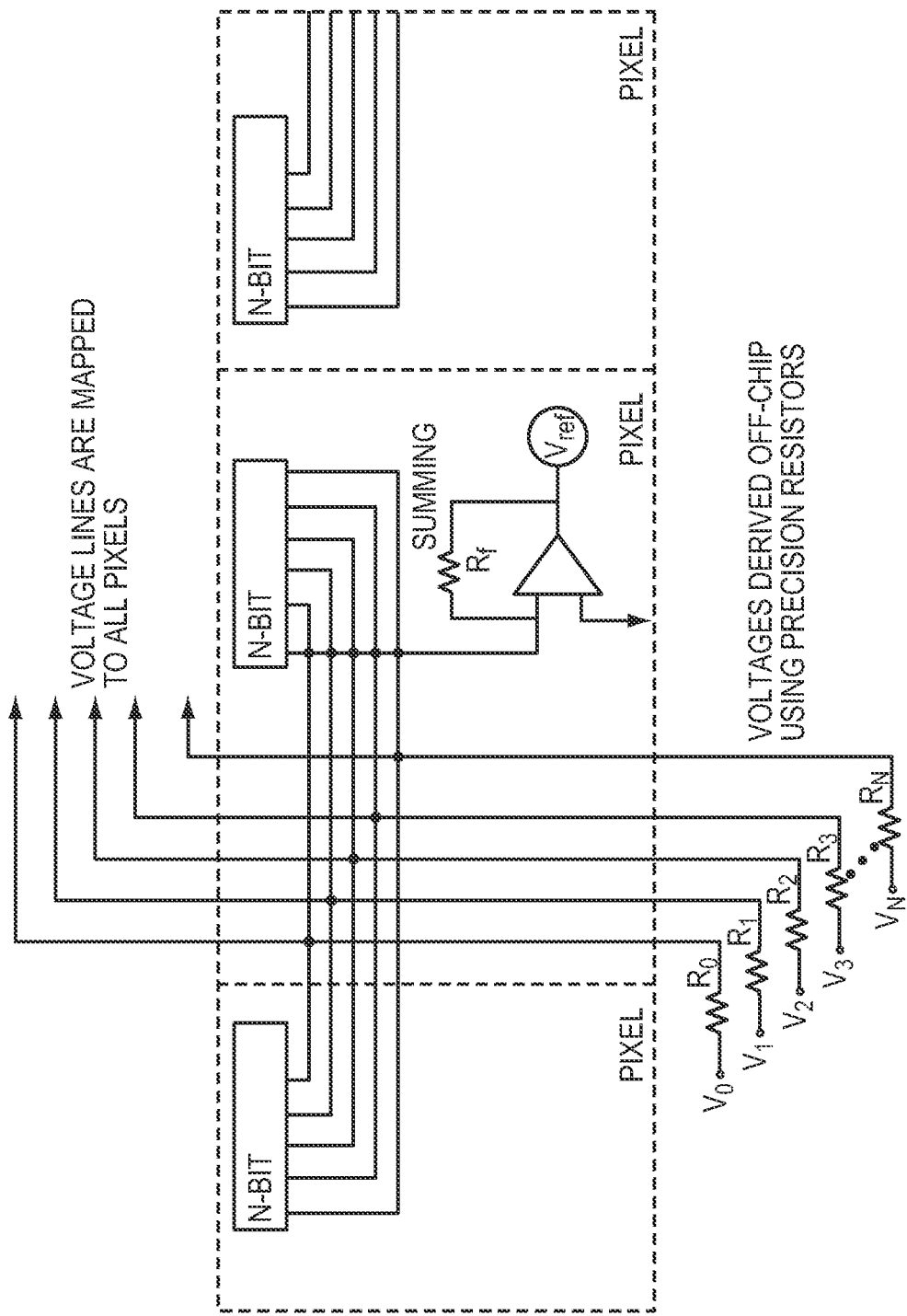
FIG. 32 is a conceptual block diagram of unit cell electronics in accordance with the principles of the present invention.

In accordance with the principles of the present invention, gain non-uniformity may be compensated using an N-bit DAC, as illustrated in FIG. 32. The N-bit DAC generates precise voltages off-chip, and feeds the values to every pixel of the DFPA. An N-bit memory in each unit cell is used to select the appropriate voltage values to input to a summing amplifier. The output voltage of the summing amplifier is used as Vref in the ADC unit cell designs described herein. The voltage is tuned uniquely in each unit cell to compensate for differences in detector quantum efficiency and other CMOS gain non-uniformities in the unit cell. Steps are not necessarily linear, but scaled to give high resolution voltage control around MSB (Vo).

Figure 33:
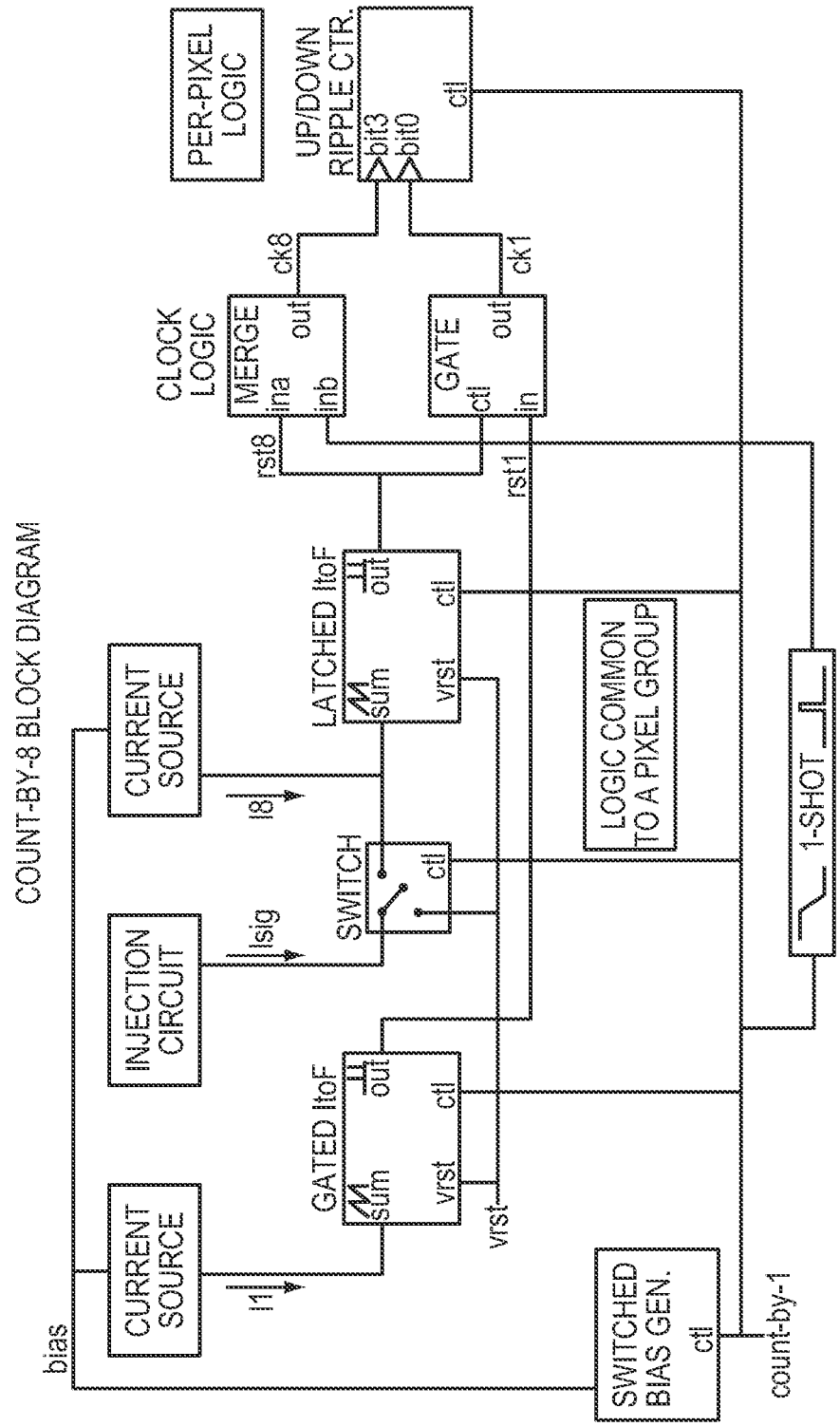
FIG. 33 is a conceptual block diagram of unit cell and clocking logic electronics in accordance with the principles of the present invention.

Turning now to FIG. 33, the figure provides a block diagram of a count-by-eight digitizing illustrative embodiment. In the illustrative embodiment, the counter counts up by eight during charge collection times and counts down by one during completion time. This approach reduced power consumption of an ROIC in accordance with the principles of the present invention by reducing the number of counting events. Count by any number is contemplated within the scope of the present invention.

The main strategy is to develop a digital count of the sampled charge in two phases. In the first phase, the collection phase, the image photocurrent, Isig, is applied to the Latched Itof in its non-latching state. The summing capacitance is chosen so that one count corresponds to 8 LSBs. Each counting pulse, rst8, is passed through to ck8, which increments the Up/down counter at bit3, increasing the digital count by 8. When the collection phase is over, the global signal, count-by-1 is asserted. This reconfigures the circuit in several ways.

1. The signal current, Isig, is shunted to the reset voltage, vrst.
2. The switched bias generator is activated, producing currents in the two Current Sources of a specified ratio. The current, I8, should be approximately equal to the largest expected value of Isig. The current, I1, should be such that the Gated ItoF will count at 8 times the rate of the Latched Itof. If C1 and C8 represent the summing capacitance of the Gated ItoF and the Latched Itof, respectively, the currents and capacitance should obey the equation C1/I1=8*C8/I8. Note that the Switched Bias Generator need not produce a precise value of I8. It is just the ratio or I8 to I1 that must be controlled closely.
3. The Gated ItoF is enabled, and the Latched ItoF is placed in its latched mode.
4. The counter is switched from counting up at bit 3 to counting down at bit 0.

When count-by-1 is asserted, there will generally be a partial charge left on the summing node of the Latched ItoF. During the completion phase, the Latched ItoF will be charged by I8 until it crosses its threshold. At that time its output, rst8, will remain latched HIGH and its summing node will remain discharged to vrst, ready to begin the next collection phase. Meanwhile, the Gated Itof, which had been counting 8 times as fast as the Latched Itof, will have produced a few pulses that pass to ck1 and decrement the counter. After the latching event, the rst1 pulses will continue to be produced, but they will no longer be gated to ck1.

The 1-shot produces an initial count at bit 3 at the start of the collection phase. The following calculation shows why this is done. Suppose the proper count is N=8*m+r, where 0<=r<8. Because of the initial count, the total increment of the counter during the collection phase will be 8*m+8. At the start of the completion phase there will be a charge on the summing node of the Latched Itof equivalent to r counts. In the time that I8 increases that charge to the equivalent of 8 counts, the Gated Itof will have produced 8−r pulses to decrement the counter at bit0. The net increment of the counter would therefore have been 8*m+8−(8−r)=8*m+r=N, the correct count.

The count-by-8 scheme requires more logic that a count-by-1 embodiment in accordance with the principles of the present invention. However it should be noted that some of the extra circuitry can be shared in common among a group of pixels, as indicated in the diagram. In particular the Gated ItoF need not be replicated at every pixel. The completion phase should be long enough that at least 8 counts can be guaranteed from the Gated ItoF, long enough for all the Latched ItoFs in the pixels it serves to have latched.

Figure 34:
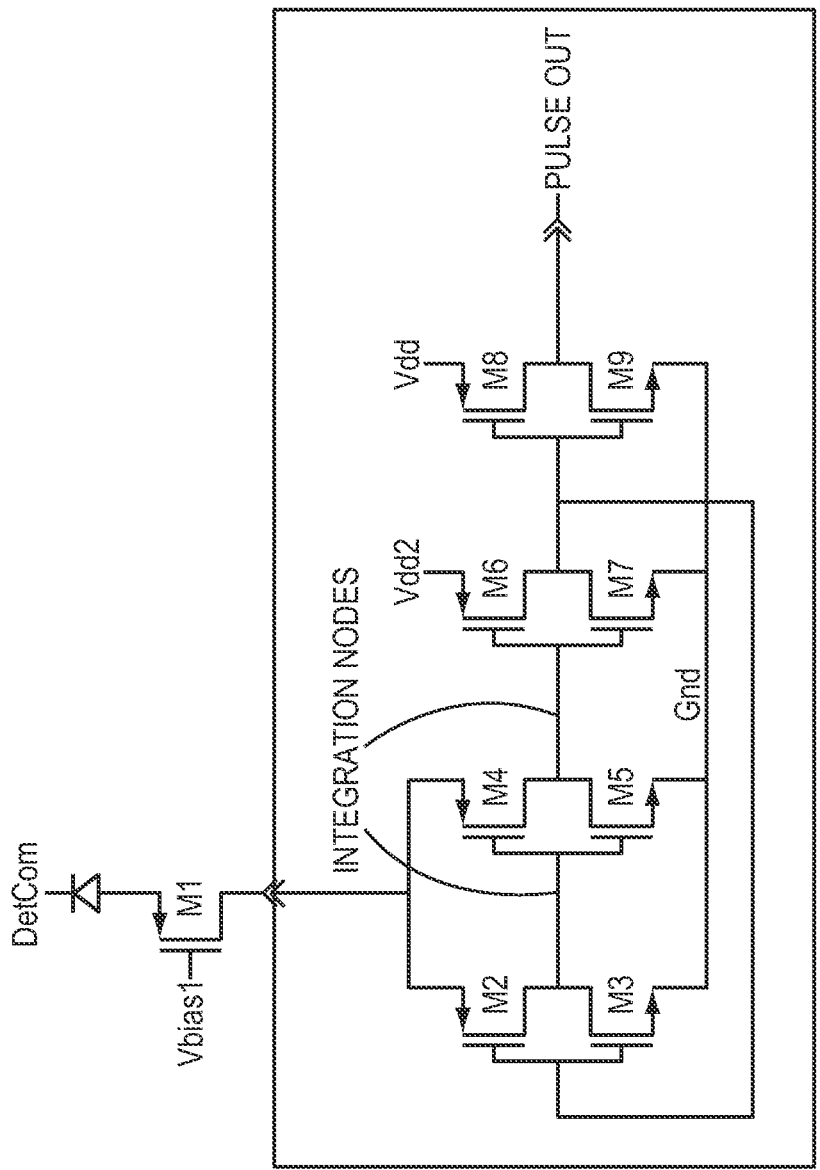
FIG. 34 is a schematic diagram of a current starved ring oscillator such as may be employed in a digital focal plane array in accordance with the principles of the present invention.

In accordance with the principles of the present invention, a pixel Current to Frequency converting ADC can be built using a current starved ring oscillator driving a counter. This circuit may have low-power advantages. Referring to FIG. 34 Transistors M2 through M7 form a three stage ring oscillator. The operation current for the first two inverters, M2, M3 and M4, M5 is the current which is converted. The supply voltage, vdd2, on the third inverters, M6, M7, might be different than the final inverter to facilitate switching. The photocurrent is steered by M2 and M4 to one of the two integration nodes.

Figure 35:
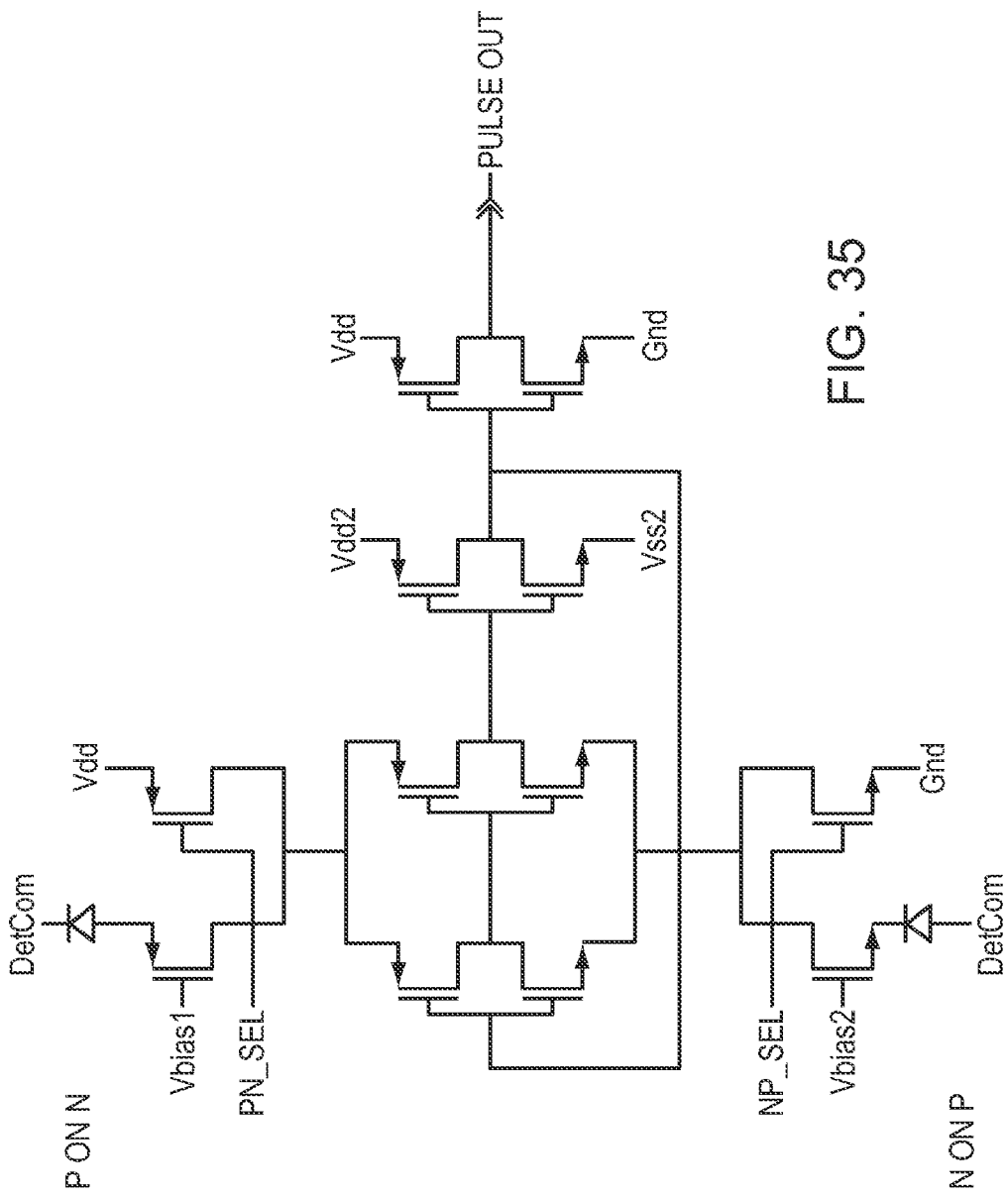
FIG. 35 is a schematic diagram of a current starved ring oscillator such as may be employed in a digital focal plane array in accordance with the principles of the present invention.

This current is integrated onto its respective node until the switching voltage of the next stage is reach, whereby, the next stage switches, and the switching propagates from stage to stage. The propagation through the first two stages is limited by whatever current is available from the sensor being measured. Therefore, because the delay through two of the three stages are controlled by the current being measured, we arrive at a highly linear current to frequency converter. The design can also easily be adapted to handle either polarity of the photodiode, for example in some 2-color stacked detector array implementations in which the bias is swathed to measure signal from either diode polarity. FIG. 35 shows the circuit implementation.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

The invention claimed is:
1. An apparatus comprising:
   a two-dimensional array of photodetectors; and
   a two-dimensional array of analog-to-digital converters (ADCs) operably coupled to the two-dimensional array of photodetectors, wherein at least one ADC in the two-dimensional array of ADCs comprises:
a modulo M counter to store a count value representing a current generated by a corresponding photodetector in the two-dimensional array of photodetectors, and wherein the apparatus has a virtual well depth based on a product of M and a least significant bit of the at least one ADC.

2. The apparatus of claim 1, wherein M is the product of two prime numbers.

3. The apparatus of claim 1, wherein the modulo M counter is a bidirectional counter.

4. The apparatus of claim 1, wherein the at least one ADC further comprises a capacitor to integrate the current generated by the corresponding photodetector.

5. The apparatus of claim 4, wherein the at least one ADC further comprises at least one of a voltage-to-frequency converter and a comparator to convert a voltage across the capacitor to a signal that increments or decrements the count value stored in the modulo M counter.

* * * * *